United States Patent
Hwang et al.

(10) Patent No.: US 9,806,609 B2
(45) Date of Patent: Oct. 31, 2017

(54) CONVERTER

(71) Applicant: SOLUM CO., LTD., Suwon-si (KR)

(72) Inventors: Bo Hyun Hwang, Suwon-Si (KR); Jin Soo Lee, Suwon-Si (KR); Min Young Ahn, Seongnam-Si (KR); Dae Hoon Han, Namyangju-Si (KR); Jung Eui Park, Suwon-Si (KR)

(73) Assignee: Solum Co., LTD., Suwon-si (KR)

( * ) Notice: Subject to any disclaimer, the term of this patent is extended or adjusted under 35 U.S.C. 154(b) by 0 days.

(21) Appl. No.: 14/822,132

(22) Filed: Aug. 10, 2015

(65) Prior Publication Data

US 2016/0111955 A1 Apr. 21, 2016

(30) Foreign Application Priority Data

Oct. 16, 2014 (KR) .......................... 10-2014-0139693

(51) Int. Cl.
*H02M 3/156* (2006.01)

(52) U.S. Cl.
CPC ......... *H02M 3/156* (2013.01); *Y02B 70/1425* (2013.01)

(58) Field of Classification Search
CPC . H02M 3/156; H02M 2001/0058; H02M 1/34
See application file for complete search history.

(56) References Cited

U.S. PATENT DOCUMENTS

| 5,909,362 | A   | * | 6/1999  | Adams   | H02M 3/33569 363/21.03 |
|-----------|-----|---|---------|---------|------------------------|
| 6,211,746 | B1  | * | 4/2001  | Segawa  | G06G 7/184 327/131     |
| 2005/0212498 | A1 | * | 9/2005 | Kubota  | H02M 3/156 323/282    |
| 2009/0086513 | A1 | * | 4/2009 | Lombardo | H02M 3/33507 363/21.12 |
| 2011/0031949 | A1 | * | 2/2011 | Zhang   | H02M 3/1563 323/282   |
| 2013/0258723 | A1 | * | 10/2013 | Fang   | H02M 3/33507 363/21.17 |
| 2015/0048678 | A1 | * | 2/2015 | Gong    | H05B 33/0851 307/24   |

* cited by examiner

*Primary Examiner* — Adolf Berhane
*Assistant Examiner* — Bart Iliya
(74) *Attorney, Agent, or Firm* — NSIP Law

(57) ABSTRACT

Disclosed herein is a converter including a switching unit, an energy storage unit for storing energy from a direct current (DC) input voltage and then generating an output voltage according to a switching operation of the switching unit, and a switching controller for controlling the switching unit to selectively execute a first operation mode for turning on the switching unit at a fixed frequency or a second operation mode for turning on the switching unit when a voltage between one end and the other end of the switching unit reaches a zero point of a resonance waveform, wherein the switching controller includes an operation mode selection unit for selectively executing the first operation mode or the second operation mode according to whether the voltage between one end and the other end of the switching unit resonates.

33 Claims, 16 Drawing Sheets

CONVERTER

CROSS REFERENCE(S) TO RELATED APPLICATIONS

This application claims the foreign priority benefit under 35 U.S.C. Section [120, 119, 119(e)] of Korean Patent Application Serial No. 10-2014-0139693, entitled "Converter" filed on Oct. 16, 2014, which is hereby incorporated by reference in its entirety into this application.

BACKGROUND

1. Technical Field

Embodiments of the present invention relates to a converter.

2. Description of the Related Art

In accordance with current trends, in terms of electronic and communication devices, a system part has been rapidly miniaturized and lightweight together with the development of a semiconductor integrated circuit, but a power part has not been miniaturized and lightweight compared with what expected due to an energy storage device such as an inductor, a capacitor, etc.

Accordingly, in order to meet the current trends of miniaturized and lightweight electronic and communication devices, it is very important to obtain a miniaturized and lightweight converter used for a power device, in particular, a switching mode power supply (SMPS), etc.

In the converter used in the SMPS, etc., as a switching frequency is increased, capacity of an energy storage device is capable of being reduced, thereby obtaining a miniaturized and lightweight converter via high-speed switching.

However, when a switching frequency is increased using a high-speed semiconductor switching device, etc., switching loss and a heating issue of the switching device are caused.

Recently, in order to overcome this problem, a so-called soft-switching method has been proposed. According to the soft-switching method, when a voltage between opposite ends of the switching device reaches a zero point or a lowest point of a resonance waveform, switching loss becomes 0 (which materially includes a scope close to 0) by turning on the switching device.

However, according to the soft-switching method, when an output voltage of a converter does not reach a sufficient level, a voltage between opposite ends of the switching device does not resonate, and thus a switching operation is not capable of being performed.

Accordingly, a converter using the soft-switching method is not capable of performing a voltage boosting operation during startup (which also includes a procedure in which power is supplied and increased to a sufficient output level and restart as well as initial startup), thereby reducing the reliability of an SMPS itself.

SUMMARY

An object of the present disclosure is to provide a converter that selectively performs soft-switching in a switching operation mode during startup and a switching operation mode after startup.

Another object of the present disclosure is to provide a converter that facilitates soft-switching using a simple circuit configuration.

According to an exemplary embodiment of the present disclosure, there is provided a converter that selectively executes a switching operation mode during startup or a switching operation mode after startup according to whether a voltage between opposite ends of a switching device resonates.

The above objects may be achieved by providing a converter for turning on a switching device when a voltage between opposite ends of a switching device reaches a zero point or lowest point of a resonance waveform.

In addition, the above objects may be achieved by providing a converter for turning on a switching device using only a configuration such as a comparator, etc.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
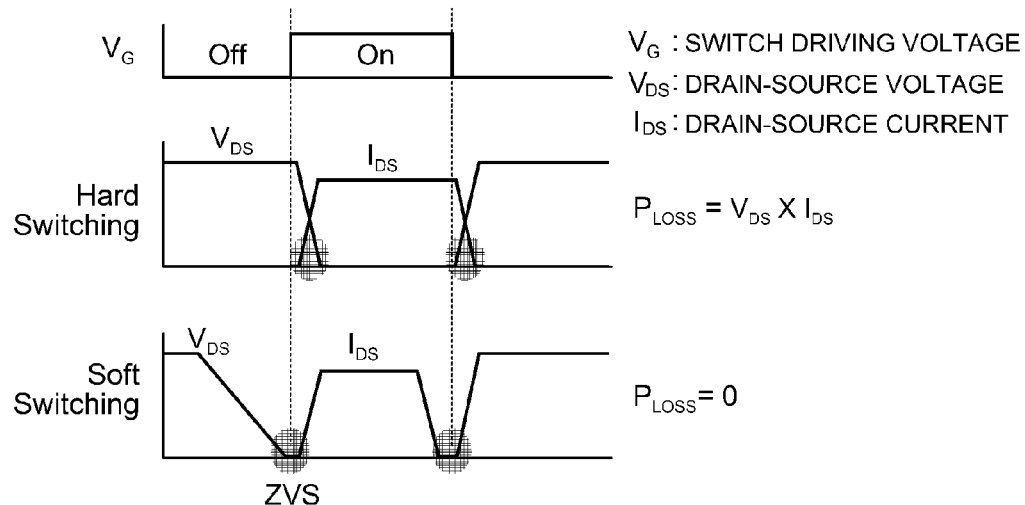
FIG. 1 is a schematic diagram of waveforms of current and voltage of a switching device according to a switching method.

Hereinafter, technological features and advantages of a converter according to exemplary embodiments of the present disclosure with regard to the object will be described in detail with reference to the accompanying drawings so that they are capable of being easily practiced by those skilled in the art to which the present disclosure pertains.

Further, in the following description of the at least one embodiment, a detailed description of known functions and configurations incorporated herein will be omitted for the purpose of clarity and for brevity. Components of the drawings are not always illustrated on a predetermined scale. For example, the sizes of some components may be exaggerated compared with other components for the purposes of promoting an understanding of the embodiments of the present disclosure. In addition, the same reference numeral in different drawings refers to the same element and like reference numerals refer to like elements with exception throughout the drawings.

The terms such as "first" and "second" are used only for the purpose of distinguishing one constituent element from another constituent element, but the constituent elements are not limited by the terms.

Necessity of Soft-Switching

FIG. 1 is a schematic diagram of waveforms of current and voltage of a switching device according to a switching method.

As illustrated in FIG. 1, in the case of hard-switching method, switching loss $P_{LOSS}$ (portions in which drain-source voltage $V_{DS}$ and drain-source current $I_{DS}$ overlap with each other) during the switching of the switching device occurs.

The aforementioned switching loss also occurs in a converter that is currently and generally used in SMPS, which will be described below with reference to FIGS. 2 and 3.

Figure 2:
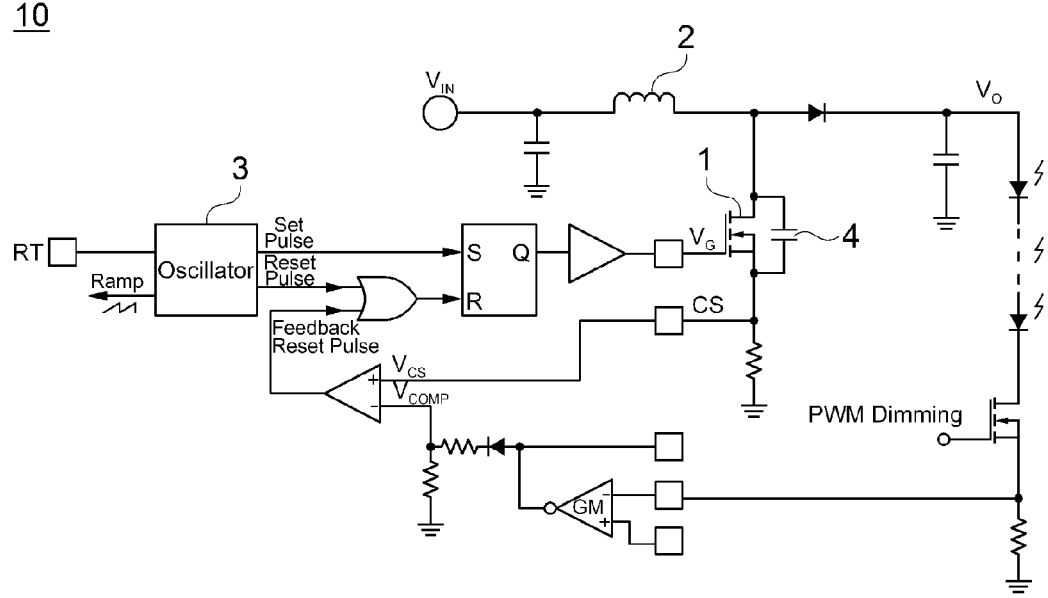
FIG. 2 is a schematic circuit diagram of a currently and generally used converter.

FIG. 2 is a schematic circuit diagram of a currently and generally used converter 10. FIG. 3 is a graph of an operation waveform of the converter 10 of FIG. 2 according to an input/output condition.

Figure 3:
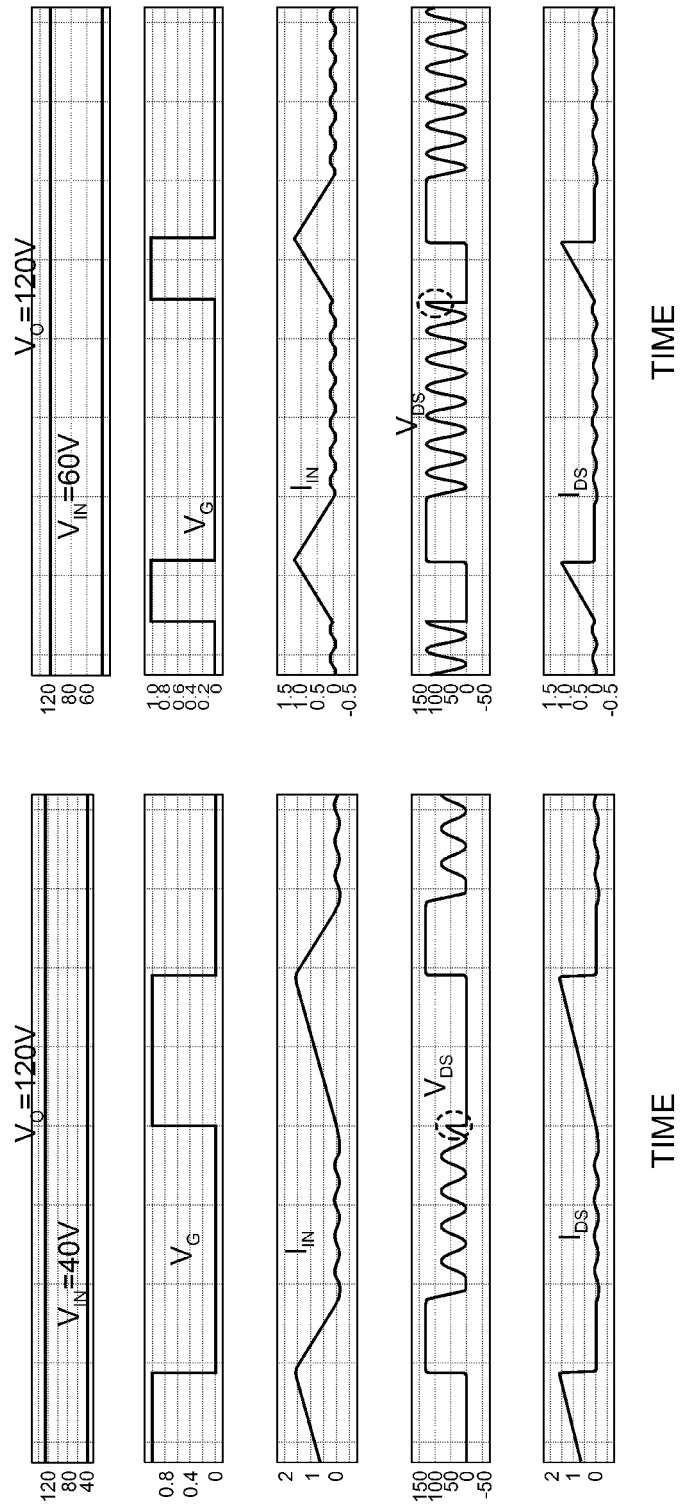
FIG. 3 is a graph of an operation waveform of the converter of FIG. 2 according to an input/output condition.

Referring to FIGS. 2 and 3, when a switching device 1 is turned on ($V_G$ is converted to a high level), as inductor current $I_{IN}$ increases, an inductor 2 stores energy. In addition, when the switching device 1 is turned off ($V_G$ is converted to a low level), the energy stored in the inductor 2 is transmitted as an output voltage $V_O$ of the converter 10.

Then when current of the inductor 2 is completely discharged, the inductor 2 and a parasitic capacitor (not shown) of the switching device 1 or the inductor 2 and a snubber capacitor 4 perform resonance in which current $I_{DS}$ flowing in the switching device 1 is repeatedly changed in a (+) direction and a (−) direction, and accordingly a voltage $V_{DS}$ of opposite ends of the switching device 1 also resonates at the same frequency as the current IDs in the switching device 1.

In this case, in the converter 10 of FIG. 2, as illustrated in FIG. 3, hard-switching whereby the switching device 1 is turned on occurs in an arbitrary voltage level (refer to a dashed line of FIG. 3) in which a resonance waveform of a voltage $V_{DS}$ between opposite ends of the switching device 1 is not 0 or a minimum value, thereby causing switching loss, a heating issue of a switching device, etc.

Figure 4:
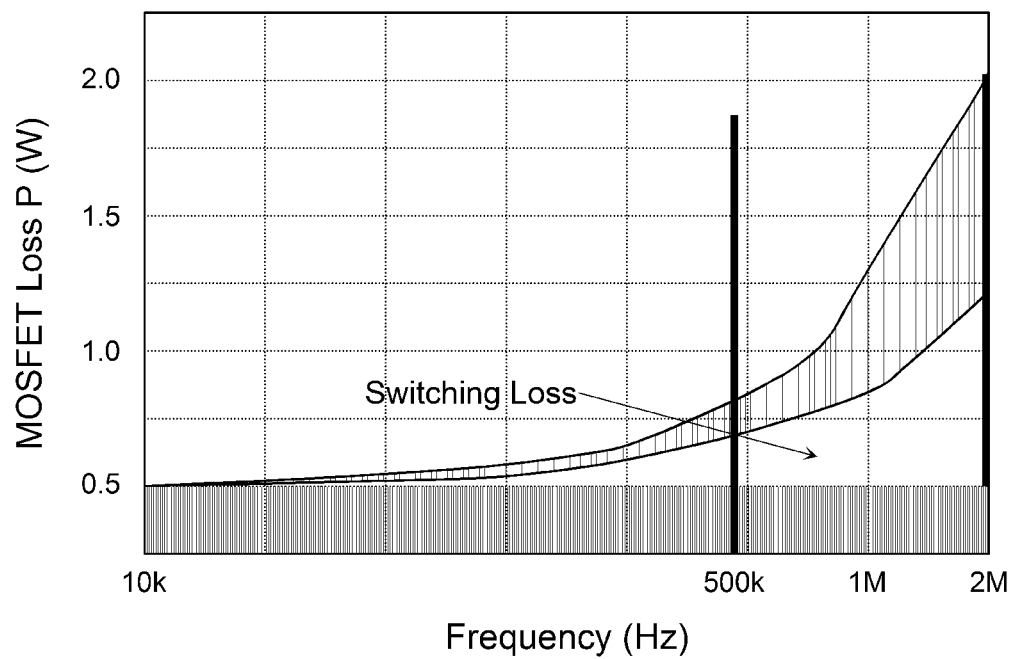
FIG. 4 is a diagram for explanation of switching loss in a hard-switching method.

Switching loss in the hard-switching method is illustrated in FIG. 4 in detail. As seen from FIG. 4, in the case of hard-switching method, switching loss increases in proportion to a frequency at a high switching frequency of 1 MHz or more.

Accordingly, in order to reduce switching loss according to high-speed switching, there is a need to switch a switching device such that switching loss $P_{LOSS}$ is 0 (which materially includes a scope close to 0), so called 'soft-switching startup', as illustrated in FIG. 1.

That is, for example, as illustrated in FIG. 1, when the switching device is turned on, a zero voltage switching (ZVS) operation in which a drain-source voltage $V_{DS}$ is 0 is performed, or although not shown, there is a need for switching startup for turning on the switching device when a voltage between opposite ends of the switching device reaches a lowest point in a resonance waveform after the switching device is turned off, so called 'valley switching' operation.

However, in the soft-switching method, when an output voltage of a converter does not increase to a sufficient level, resonance does not occur in a drain-source voltage $V_{DS}$, and thus, when a converter using the soft-switching method is driven, the voltage boosting operation is not capable of being performed.

Accordingly, the exemplary embodiment of the present disclosure employs an example of switching control configuration in which soft-switching is achieved only via a simple circuit configuration and a voltage boosting operation is also possible during soft-switching is driven, which will be described below in detail.

First Embodiment

Figure 5:
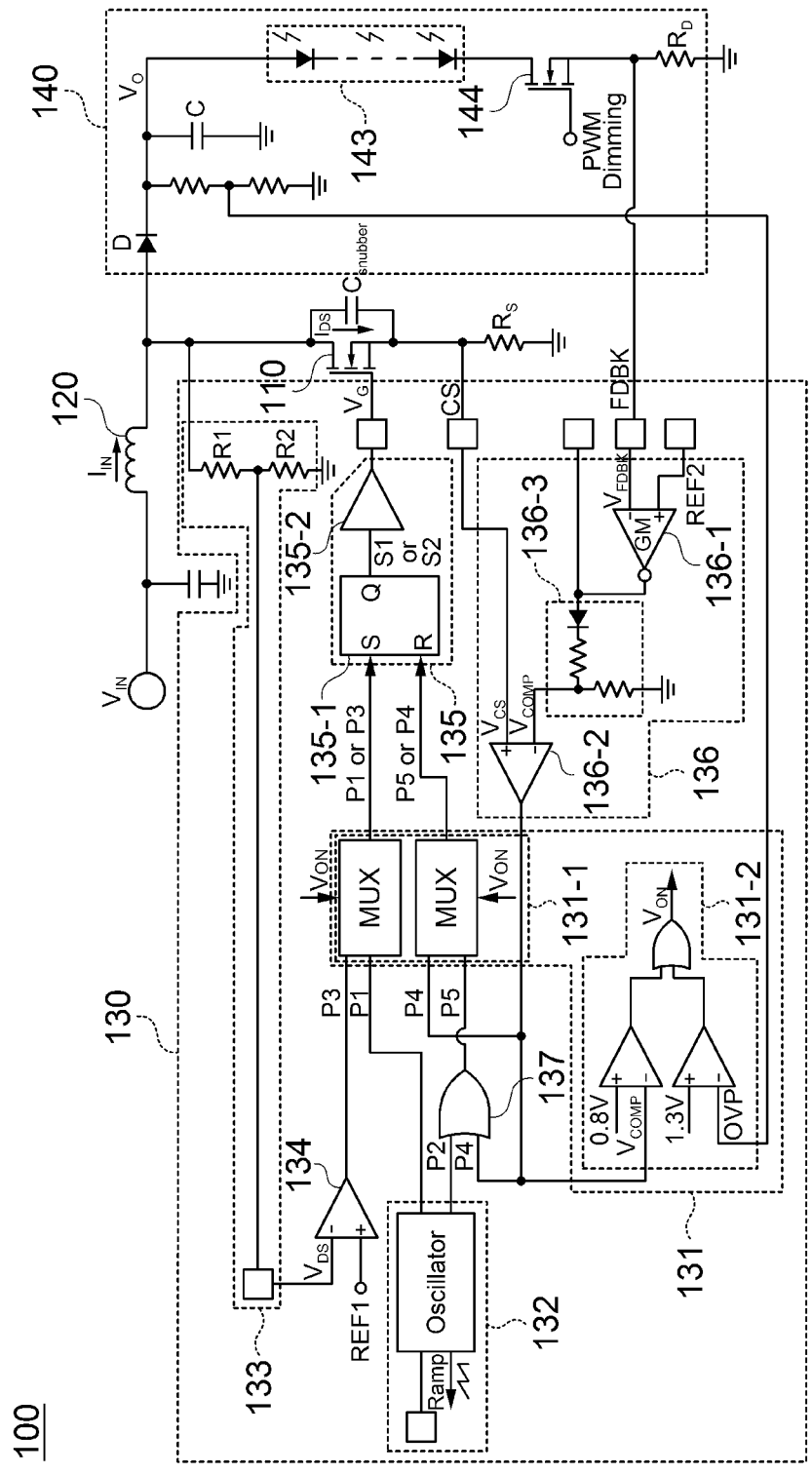
FIG. 5 is a schematic circuit diagram of a converter according to a first embodiment of the present disclosure.

FIG. 5 is a schematic circuit diagram of a converter 100 according to a first embodiment of the present disclosure.

The exemplary embodiment of the present disclosure is described in terms of a boost converter, but the present disclosure is not limited thereto. In addition, the converter 100 according to the exemplary embodiment of the present disclosure is configured to supply power to a light emitting diode (LED) string 143 having a plurality of LED devices that are connected in series to each other, but the present disclosure is not limited thereto.

As illustrated in FIG. 5, the converter 100 according to the exemplary embodiment of the present disclosure may include a switching unit 110, an energy storage unit 120, a switching controller 130, and an output unit 140.

Although not illustrated, the converter 100 according to the exemplary embodiment of the present disclosure may include a power supplier for rectifying alternating current (AC) input power to generate direct current (DC) input power $V_{IN}$, and the power supplier may include a bridge diode, a line filter, etc.

In this case, the bridge diode may be configured of four diodes and full-wave rectify AC input power to generate direct current (DC) input power $V_{IN}$ in FIG. 5.

In addition, the line filter may include two capacitors that are connected in parallel to opposite ends to which AC power is input and two inductors that are respectively connected in series to opposite ends to which AC power is input.

In this case, the line filter may filter electro-magnetic interference of AC input power.

The switching unit 110 according to the exemplary embodiment of the present disclosure may be embodied as an FET switching device, but the present disclosure is not limited thereto. Any switching device may be employed as long as the switching device is capable of performing a switching operation.

The switching unit 110 according to the exemplary embodiment of the present disclosure may have a parasitic capacitor formed between a drain electrode and a source electrode, and a snubber capacitor $C_{snubber}$ may be connected in parallel to the switching unit 110, as illustrated in FIG. 5.

Hereinafter, a voltage between opposite ends of the switching unit 110 will be referred to as a "drain voltage $V_{DS}$" and current flowing in the switching unit 110 will be referred to as "drain current $I_{DS}$".

In addition, the energy storage unit 120 according to the exemplary embodiment of the present disclosure may be generally embodied as an inductor, and as illustrated in FIG. 5, DC input power $V_{IN}$ is supplied to one end of the energy storage unit 120, and an anode electrode of an output diode D and one end (drain electrode) of the switching unit 110 are connected to the other end of the energy storage unit 120.

The direct current input power $V_{IN}$ may be transmitted to the energy storage unit 120. In this case, the energy storage unit 120 may store energy from current (hereinafter, referred to as "energy storage unit current $I_{IN}$") flowing in the energy storage unit 120 according to the direct current input power $V_{IN}$ and then generate an output voltage $V_O$ using the energy.

The aforementioned energy storage and generation of the output voltage $V_O$ of the energy storage unit 120 are controlled according to a switching operation of the switching unit 110.

That is, while the switching unit 110 is turned on, as the energy storage unit current $I_{IN}$ is increased, the energy storage unit 120 stores energy. In addition, while the switching unit 110 is turned off, as the energy storage unit current $I_{IN}$ flows through an output diode D connected between the energy storage unit 120 and an output terminal of the converter 100, the energy stored in the energy storage unit 120 is transmitted to the output unit 140 so as to generate an output voltage $V_O$.

When the switching unit 110 is turned off and the output diode D is conducted, the energy storage unit current $I_{IN}$ flows to load 143 (LED string of the exemplary embodiment of the present disclosure) of the output unit 140 so as to charge an output capacitor C.

In this case, as the load increases, the energy storage unit current $I_{IN}$ supplied to the load 143 increases, and thus current flowing in the output capacitor C is relatively reduced, thereby relatively reducing the output voltage $V_O$.

On the other hand, as the load decreases, the energy storage unit current $I_{IN}$ supplied to the load 143 decreases, current flowing in the output capacitor C is relatively increased, thereby relatively increasing the output voltage $V_O$.

According to the aforementioned operation, the output voltage $V_O$ may be maintained constant irrespective change in load.

The converter 100 according to the exemplary embodiment of the present disclosure may further include a detection resistor $R_S$, as illustrated in FIG. 5.

The detection resistor $R_S$ is connected between ground and a source electrode of the switching unit 110 and generates a detection voltage $V_{CS}$. The detection voltage $V_{CS}$ is generated through drain current IDs flowing in the detection resistor $R_S$, and thus information of energy storage unit current $I_{IN}$ is reflected.

In this case, the drain current $I_{DS}$ flows from one end to the other end of the detection resistor $R_S$, and thus the detection voltage $V_{CS}$ according to the exemplary embodiment of the present disclosure is a positive voltage.

The switching controller 130 controls the switching unit 110 to selectively perform a switching operation mode for turning on the switching unit 110 at a fixed frequency or a switching operation mode for turning on the switching unit 110 when a voltage between one end and the other end of the switching unit 110, i.e., a drain voltage $V_{DS}$ reaches a zero point of a resonance waveform.

Hereinafter, the switching operation mode for turning on the switching unit 110 at a fixed frequency will be referred to as a "first operation mode", and the switching operation mode for turning on the switching unit 110 when the drain voltage $V_{DS}$ reaches a zero point of a resonance waveform will be referred to as a "second operation mode".

As illustrated in FIG. 5, the switching controller 130 may include an operation mode selection unit 131 in order to control the aforementioned switching operation mode.

In this case, the operation mode selection unit 131 may selectively execute the first operation mode or the second operation mode according to whether the drain voltage $V_{DS}$ resonates, and for example, may execute the first operation mode in a period in which the drain voltage $V_{DS}$ does not resonate and execute the second operation mode in a period in which the drain voltage $V_{DS}$ resonates.

In general, the output voltage $V_O$ during converter startup does not increase to a sufficient level to be lower than the sum of DC input voltage $V_{IN}$ and a turn-on voltage (e.g. 0.7 V) of the output diode D. Accordingly, during converter startup, a voltage difference between the DC input voltage $V_{IN}$ and the output voltage $V_O$ is not high, and thus resonance may not occur in the drain voltage $V_{DS}$.

On the other hand, the output voltage $V_O$ after startup increases to a sufficient level to be equal to or more than the sum of the DC input voltage $V_{IN}$ and the turn-on voltage of the output diode D such that the drain voltage $V_{DS}$ resonates.

In the end, selection of a switching operation mode according to whether the drain voltage $V_{DS}$ resonates may have the same meaning as selection of a switching operation mode according to the amplitude of an output voltage $V_O$.

Accordingly, the operation mode selection unit 131 may execute the first operation mode when the amplitude of the output voltage $V_O$ is lower than the sum of a turn-on voltage of the output diode D and the direct current input voltage $V_{IN}$, and execute the second operation mode when the amplitude of the output voltage $V_O$ is equal to or more than the sum of the turn-on voltage of the output diode D and the direct current input voltage $V_{IN}$.

In the end, as seen from the aforementioned description, the first operation mode according to the exemplary embodiment of the present disclosure is a switching operation mode for turning on the switching unit 110 at a fixed frequency in a period in which the drain voltage $V_{DS}$ does not resonate, and the second operation mode according to the exemplary embodiment of the present disclosure is a switching operation mode for turning on the switching unit 110 when the drain voltage $V_{DS}$ reaches a zero point of a resonance waveform in a period in which the drain voltage $V_{DS}$ resonates.

In other words, the first operation mode according to the exemplary embodiment of the present disclosure is a switching operation mode during startup in which hard-switching is performed at a fixed frequency irrespective resonance of the drain voltage $V_{DS}$, and the second operation mode according to the exemplary embodiment of the present disclosure is a switching operation mode after startup in which soft-switching of a zero voltage switching method is performed.

In the end, the switching controller 130 according to the exemplary embodiment of the present disclosure may control the operation mode selection unit 131 to execute in the first operation mode of a hard-switching method during startup and to execute in the second operation mode of a soft-switching method after startup.

Under the aforementioned control of the switching controller 130, the converter 100 according to the exemplary embodiment of the present disclosure may selectively control a switching operation mode to perform a hard-switching method during startup and a soft-switching method after startup, and accordingly the voltage boosting operation is possible during startup when the soft-switching method is performed.

Accordingly, according to the exemplary embodiment of the present disclosure, the issue in which the voltage boosting operation is not performed during startup when soft-switching is performed may be overcome, thereby further enhancing the reliability of an SMPS itself.

According to the exemplary embodiment of the present disclosure, soft-switching of a switching device after startup is possible, thereby minimizing switching loss due to high-speed switching, the heating issue of the switching device, etc. As such, in the end, according to the exemplary embodiment of the present disclosure, miniaturization and weight reduction may also be achieved by virtue of capacity reduction of an inductor, a capacitor, etc.

However, when zero-voltage switching according to the exemplary embodiment of the present disclosure is performed, if a voltage level of the DC input power $V_{IN}$ exceeds 50% of the output voltage $V_O$, it is not possible to detect zero point in a period in which the drain voltage $V_{DS}$ resonates, and thus a voltage boosting operation may not be performed after startup.

Accordingly, according to the exemplary embodiment of the present disclosure, for zero-voltage switching after startup, a voltage level of the DC input power $V_{IN}$ may be equal to or less than 50% of a voltage level of the output voltage $V_O$.

Hereinafter, configuration of the switching controller 130 will be described in detail with reference to FIG. 5.

As illustrated in FIG. 5, the switching controller 130 according to the exemplary embodiment of the present disclosure may include the operation mode selection unit 131, a fixed frequency signal output unit 132, a voltage detector 133, a third signal output unit 134, and a switching driver 135.

As illustrated in FIG. 5, the operation mode selection unit 131 may include a selection unit 131-1 and an operation selection signal output unit 131-2.

The selection unit 131-1 may selectively execute a switching operation mode of the first operation mode or the second operation mode.

In this case, as illustrated in FIG. 5, the selection unit 131-1 according to the exemplary embodiment of the present disclosure may employ a multiplexer, but the present disclosure is not limited thereto. The selection unit 131-1 may employ any device as long as the first operation mode or the second operation mode may be selectively changed.

In addition, as illustrated in FIG. 5, the operation selection signal output unit 131-2 may be embodied as a comparator, an OR gate, etc. and accordingly may output an operation selection signal VON to the selection unit 131-1 to control an operation of the selection unit 131-1.

Selection of a switching operation mode according to the aforementioned operation mode selection unit 131 will be described with regard to an operation procedure that will be described later.

As illustrated in FIG. 5, the fixed frequency signal output unit 132 according to the exemplary embodiment of the present disclosure may be embodied as an oscillator or the like and accordingly, may output a first signal P1 and a second signal P2 of a fixed frequency through the oscillator or the like.

In this case, the first signal P1 is a signal of a fixed frequency for turning on the switching unit 110 and the second signal P2 is a signal of a fixed frequency for turning off the switching unit 110.

The voltage detector 133 according to the exemplary embodiment of the present disclosure detects a drain voltage $V_{DS}$ at a time point when resonance is started, i.e., the drain voltage $V_{DS}$ at a resonance waveform.

In this case, as illustrated in FIG. 5, the voltage detector 133 may be formed in the form of a voltage distributer including a plurality of voltage dividing resistors R1 and R2 that are connected between ground and a drain electrode of the switching unit 110. However, the present disclosure is not limited thereto. For example, the voltage detector 133 may be configured to include a plurality of capacitors instead of a plurality of voltage dividing resistors. In this case, it is advantageous in that leakage current of a boost end may be prevented compared with the configuration including a plurality of voltage dividing resistors.

The third signal output unit 134 compares a voltage $V_{DS}$ that is distributed and detected by the voltage detector 133 and a first reference voltage REF1 corresponding to a zero point of a resonance waveform and outputs a third signal P3 for turning on the switching unit 110 according to the comparison result.

As illustrated in FIG. 5, the third signal output unit 134 may be configured as a comparator including an inverting input terminal (−) to which the drain voltage $V_{DS}$ detected by the voltage detector 133 is input and a non-inverting input terminal (+) to which the first reference voltage REF1 is input.

In this case, the third signal output unit 134 outputs the third signal P3 when the drain voltage $V_{DS}$ detected by the voltage detector 133 is equal to or less than the first reference voltage REF1.

As illustrated in FIG. 5, the switching controller 130 according to the exemplary embodiment of the present disclosure may include a fourth signal output unit 136 and a fifth signal output unit 137.

The fourth signal output unit 136 outputs a fourth signal P4 for turning off the switching unit 110 by using a feedback voltage $V_{FDBK}$ obtained via voltage-distributing the output voltage $V_O$ by a distribution resistor RD of the output unit 140 and a detection voltage $V_{CS}$ generated by a detection resistor $R_S$.

In this case, as illustrated in FIG. 5, the feedback voltage $V_{FDBK}$ is detected from a source electrode of a dimming switch 144 of the output unit 140 and input to an input pin FDBK of the switching controller 130.

In addition, as illustrated in FIG. 5, the detection voltage $V_{CS}$ is detected by the detection resistor $R_S$ and input to an input pin CS of the switching controller 130.

As illustrated in FIG. 5, the fourth signal output unit 136 may include a first comparator 136-1 and a second comparator 136-2.

The first comparator 136-1 compares the feedback voltage $V_{FDBK}$ and a second reference voltage REF2 which is an error reference voltage and amplifies the error to generate and output a comparison voltage $V_{COMP}$ which is an error amplification signal.

In this case, as illustrated in FIG. 5, the first comparator 136-1 includes an inverting input terminal (−) to which the feedback voltage $V_{FDBK}$ is input and a non-inverting input terminal (+) to which the second reference voltage REF2 is input.

Accordingly, the first comparator 136-1 amplifies a voltage obtained by subtracting the feedback voltage $V_{FDBK}$ from the second reference voltage REF2 which is an error reference voltage to generate the comparison voltage $V_{COMP}$ which is an error amplification signal.

In addition, the second comparator 136-2 compares the detection voltage $V_{CS}$ for reflecting information about the energy storage unit current $I_{IN}$ and the comparison voltage $V_{COMP}$ output from the first comparator 136-1 to generate and output the fourth signal P4 for turning off the switching unit 110 according to the comparison result.

In this case, as illustrated in FIG. 5, the second comparator 136-2 includes an inverting input terminal (−) to which the comparison voltage $V_{COMP}$ is input and a non-inverting input terminal (+) to which the detection voltage $V_{CS}$ is input.

In this case, when the detection voltage $V_{CS}$ is equal to or more than the comparison voltage $V_{COMP}$, the second comparator 136-2 outputs the fourth signal P4.

In addition, the fourth signal output unit 136 according to the exemplary embodiment of the present disclosure may include a comparison voltage divider 136-3.

In this case, as illustrated in FIG. 5, the comparison voltage divider 136-3 is connected between an output terminal of the first comparator 136-1 and the inverting input terminal (−) of the second comparator 136-2, divides the comparison voltage $V_{COMP}$ output from the first comparator 136-1, and outputs the divided comparison voltage $V_{COMP}$ to the inverting input terminal (−) of the second comparator 136-2.

As illustrated in FIG. 5, the fifth signal output unit 137 according to the exemplary embodiment of the present disclosure may be embodied as an OR gate.

Accordingly, the fifth signal output unit 137 according to the exemplary embodiment of the present disclosure may output a fifth signal P5 when the second signal P2 is input to the fifth signal output unit 137 from the fixed frequency signal output unit 132 or the fourth signal P4 is input to fifth signal output unit 137 from the fourth signal output unit 136.

As illustrated in FIG. 5, the switching driver 135 according to the exemplary embodiment of the present disclosure may include a switching control signal output unit 135-1 and a switching driving signal output unit 135-2.

According to the exemplary embodiment of the present disclosure, the switching control signal output unit 135-1 is embodied as an SR flip-flop, but the present disclosure is not limited thereto.

As illustrated in FIG. 5, the switching control signal output unit 135-1 may include a set input terminal S to which the first signal P1 or the third signal P3 is input, a reset input terminal R to which the fourth signal P4 or the fifth signal P5 is input, and an output terminal Q from which a first switching control signal S1 or a second switching control signal S2 is output.

The switching control signal output unit 135-1 generates and outputs the first switching control signal S1 for generation of a switching driving signal $V_G$ according to the first signal P1 output from the fixed frequency signal output unit 132 and the fifth signal P5 output from the fifth signal output unit 137 when the first operation mode is selected by the operation mode selection unit 131 during startup.

Accordingly, when the first operation mode is selected by the operation mode selection unit 131 during startup, the switching control signal output unit 135-1 outputs the first switching control signal S1 corresponding to the first signal P1 and the fifth signal P5.

For example, when the first operation mode is selected by the operation mode selection unit 131 during startup, the switching control signal output unit 135-1 according to the exemplary embodiment of the present disclosure outputs the first switching control signal S1 of a high level according to the first signal P1 input to the set input terminal S and outputs the first switching control signal S1 of a low level according to the fifth signal P5 input to the reset input terminal R.

When the first operation mode is selected by the operation mode selection unit 131 during startup, the switching driving signal output unit 135-2 outputs a switching driving signal $V_G$ for turning on and off the switching unit 110 according to the first switching control signal S1 output from the switching control signal output unit 135-1.

For example, the switching driving signal output unit 135-2 according to the exemplary embodiment of the present disclosure generates a switching driving signal $V_G$ of a high level and outputs the switching driving signal $V_G$ to the switching unit 110 when the first switching control signal S1 of a high level is input to the switching driving signal output unit 135-2, and the switching driving signal output unit 135-2 generates a switching driving signal $V_G$ of a low level and outputs the switching driving signal $V_G$ to the switching unit 110 when the first switching control signal S1 of a low level is input to the switching driving signal output unit 135-2.

As illustrated in FIG. 5, the switching unit 110 according to the exemplary embodiment of the present disclosure employs an N-channel type FET switching device, and thus when the switching driving signal $V_G$ is at a high level, the switching unit 110 is turned on, and when the switching driving signal $V_G$ is at a low level, the switching unit 110 is turned off.

In the end, when the first operation mode is selected by the operation mode selection unit 131 during startup, the switching driver 135 according to the exemplary embodiment of the present disclosure turns on the switching unit 110 in response to the first signal P1 of a fixed frequency.

In addition, when the first operation mode is selected by the operation mode selection unit 131 during startup, the switching driver 135 according to the exemplary embodiment of the present disclosure turns off the switching unit 110 in response to the fifth signal P5 according to the second or fourth signal P2 or P4.

When startup is completed and the second operation mode is selected by the operation mode selection unit 131, the switching control signal output unit 135-1 generates and outputs the second switching control signal S2 for generation of the switching driving signal $V_G$ according to the third signal P3 output from the third signal output unit 134 and the fourth signal P4 output from the fourth signal output unit 136.

Accordingly, when startup is completed and the second operation mode is selected by the operation mode selection unit 131, the switching control signal output unit 135-1 outputs the second switching control signal S2 corresponding to the third signal P3 and the fourth signal P4.

For example, when startup is completed and the second operation mode is selected by the operation mode selection unit 131, the switching control signal output unit 135-1 according to the exemplary embodiment of the present disclosure outputs the second switching control signal S2 of a high level according to the third signal P3 input to the set input terminal S and outputs the second switching control signal S2 of a low level according to the fourth signal P4 input to the reset input terminal R.

When startup is completed and the second operation mode is selected by the operation mode selection unit 131, the switching driving signal output unit 135-2 outputs the switching driving signal $V_G$ for turning on or off the switching unit 110 according to the second switching control signal S2 output from the switching control signal output unit 135-1.

For example, the switching driving signal output unit 135-2 according to the exemplary embodiment of the present disclosure generates a switching driving signal $V_G$ of a high level and outputs the switching driving signal $V_G$ to the switching unit 110 when the second switching control signal S2 of a high level is input to the switching driving signal output unit 135-2, and the switching driving signal output unit 135-2 generates a switching driving signal $V_G$ of a low level and outputs the switching driving signal $V_G$ to the switching unit 110 when the second switching control signal S2 of a low level is input to the switching driving signal output unit 135-2.

As illustrated in FIG. 5, the switching unit 110 according to the exemplary embodiment of the present disclosure employs an N-channel type FET switching device, and thus when the switching driving signal $V_G$ is at a high level, the switching unit 110 is turned on, and when the switching driving signal $V_G$ is at a low level, the switching unit 110 is turned off.

In the end, the switching driver 135 according to the exemplary embodiment of the present disclosure turns on the switching unit 110 in response to the third signal P3 including zero point information of a resonance waveform when startup is completed and the second operation mode is selected by the operation mode selection unit 131.

In addition, the switching driver 135 according to the exemplary embodiment of the present disclosure turns off the switching unit 110 in response to the fourth signal P4 when startup is completed and the second operation mode is selected by the operation mode selection unit 131.

Hereinafter, a switching operation mode according to the exemplary embodiment of the present disclosure will be divided into the first operation mode and the second operation mode and described.

<First Operation Mode>

Figure 6A:
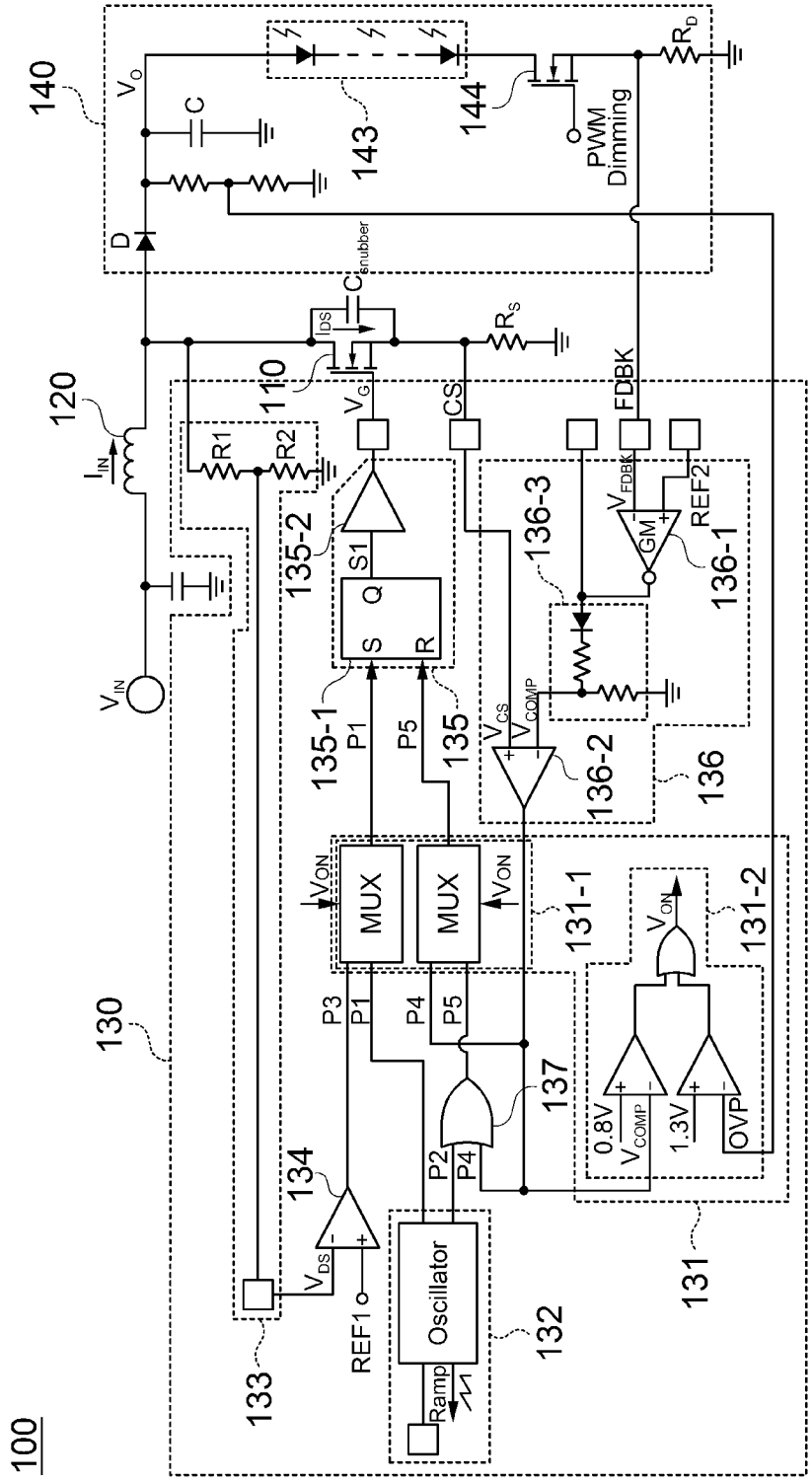
FIG. 6A is a circuit diagram of a case in which the converter of FIG. 5 executes a first operation mode.
Figure 6B:
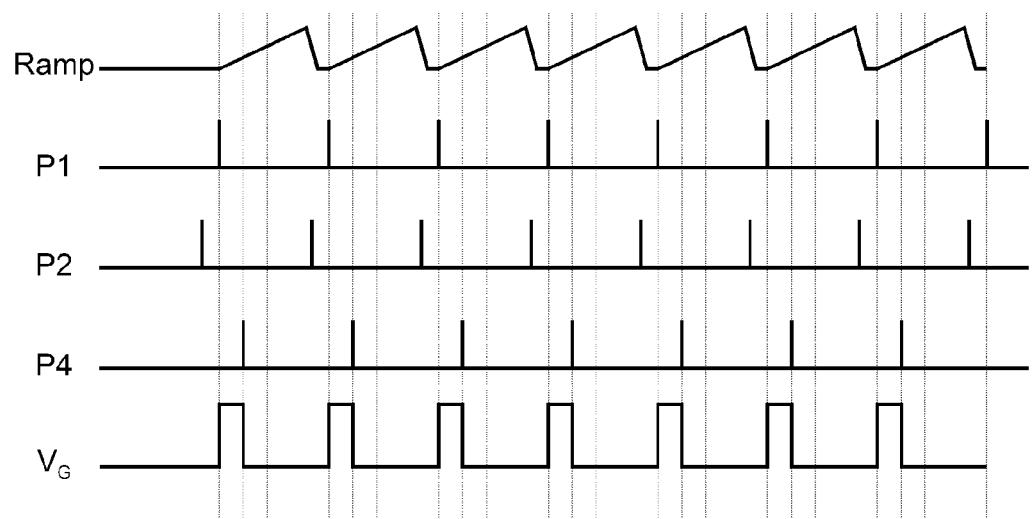
FIG. 6B is a graph showing signal waveforms of main components of the converter of FIG. 6A.

FIG. 6A is a circuit diagram of a case in which the converter 100 of FIG. 5 executes a first operation mode, and FIG. 6B is a graph showing signal waveforms of main components of the converter 100 of FIG. 6A.

Hereinafter, according to the exemplary embodiment of the present disclosure, a switching operation according to the first operation mode will be described with reference to FIGS. 5, 6A, and 6B.

The operation mode selection unit 131 selects the first operation mode when a startup condition is satisfied. For example, when the comparison voltage $V_{COMP}$ generated by the first comparator 136-1 is equal to or less than a predetermined voltage (0.8 V in the exemplary embodiment of the present disclosure) or an OVP voltage detected from an output terminal of the converter 100 is equal to or less than a predetermined voltage (1.3 V in the exemplary embodiment of the present disclosure), the operation mode selection unit 131 may select the first operation mode via an operation selection signal VON as illustrated in FIGS. 5 and 6A. This is because, since the amplitude of the output voltage $V_O$ of the converter 100 is lower than the sum of the DC input voltage $V_{IN}$ and a turn on voltage (e.g. 0.7 V) of the output diode D under the aforementioned condition, the drain voltage $V_{DS}$ does not resonate, and thus the converter 100 has an operation state during startup under the aforementioned condition.

When the first operation mode is selected by the operation mode selection unit 131 as described above, the first signal P1 is output from the fixed frequency signal output unit 132 that is embodied as an oscillator, etc. In this case, the first signal P1 is a signal of a fixed frequency, as illustrated in FIG. 6B.

According to the first signal P1 of a fixed frequency, the switching driving signal $V_G$ of a high level is output through the switching driver 135, and thus the switching unit 110 is turned on.

In a turn-on period of the dimming switch 144, the feedback voltage $V_{FDBK}$ is detected from a source electrode of the dimming switch 144, and the feedback voltage $V_{FDBK}$ and the second reference voltage (an error reference voltage, REF2) are compared with each other and the error is amplified so as to output the comparison voltage $V_{COMP}$ which is an error amplification voltage.

Then the detection voltage $V_{CS}$ that reflects information about the energy storage unit current $I_{IN}$ is detected via a detection resistor $R_S$, and the detection voltage $R_S$ and the comparison voltage $V_{COMP}$ are compared with each other to output the fourth signal P4 illustrated in FIG. 6B.

When the fourth signal P4 is input or the second signal P2 (refer to P2 of FIG. 6B) output from the fixed frequency signal output unit 132 is input, the fifth signal output unit 137 outputs the fifth signal P5.

The switching driving signal $V_G$ of a low level is output through the switching driver 135 according to the fifth signal P5, and accordingly, the switching unit 110 is turned off.

<Second Operation Mode>

Figure 7A:
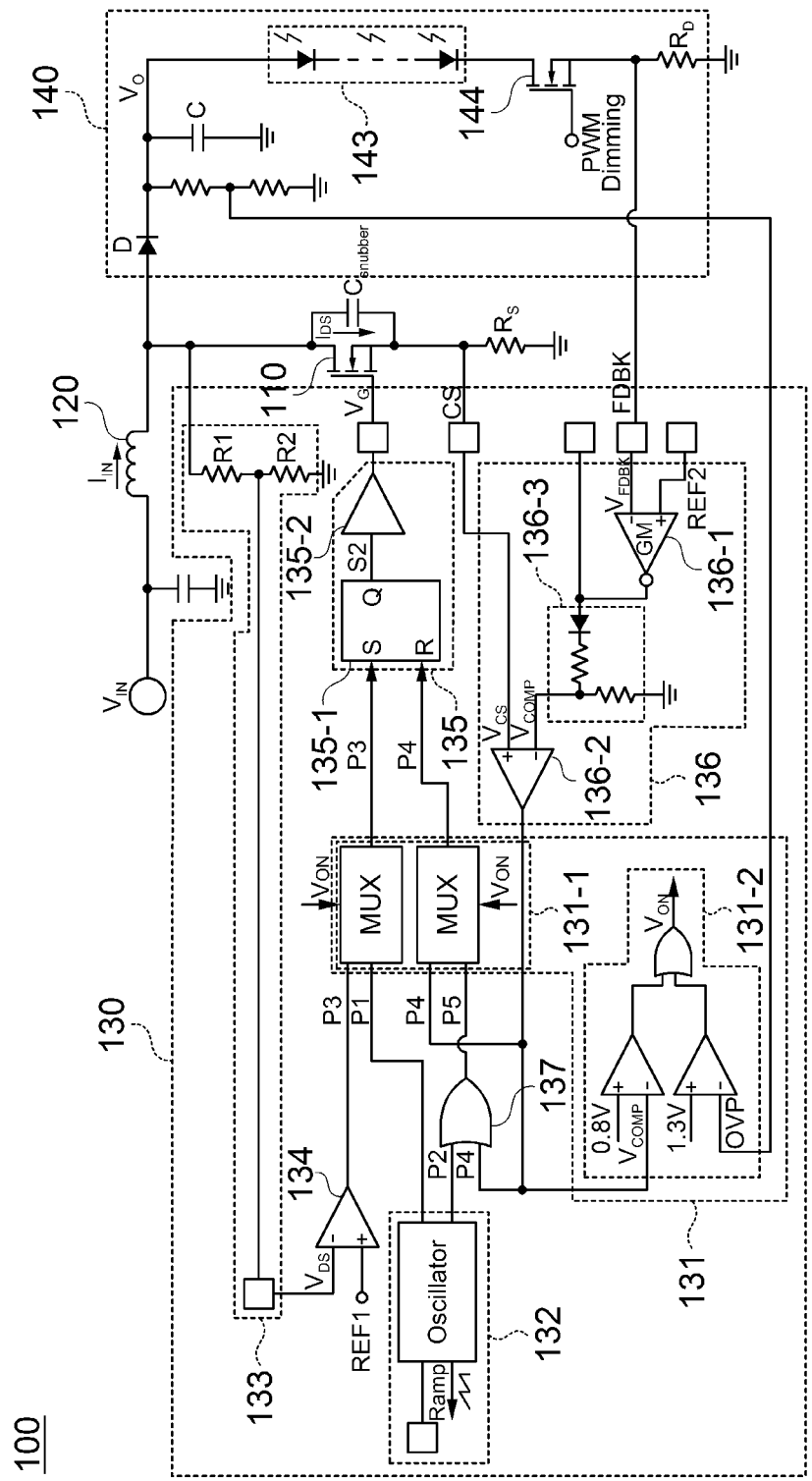
FIG. 7A is a circuit diagram of a case in which the converter of FIG. 5 executes a second operation mode.
Figure 7B:
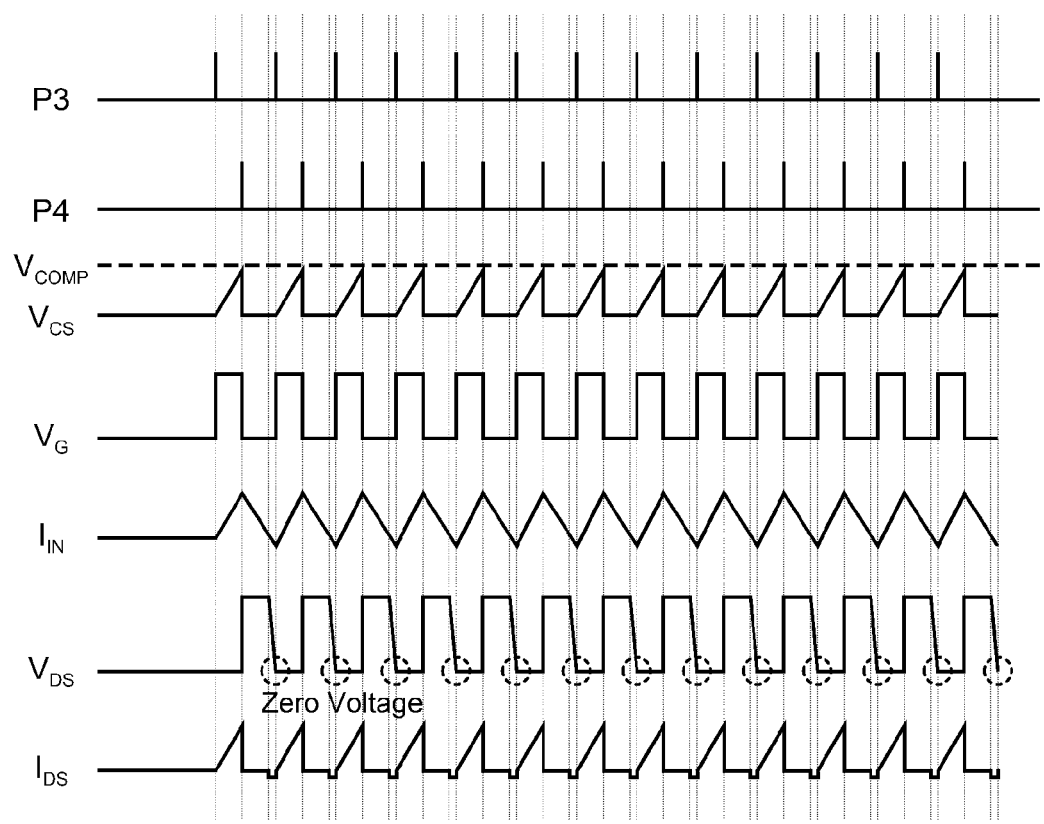
FIG. 7B is a graph showing signal waveforms of main components of the converter of FIG. 7A.

FIG. 7A is a circuit diagram of a case in which the converter 100 of FIG. 5 executes a second operation mode, and FIG. 7B is a graph showing signal waveforms of main components of the converter 100 of FIG. 7A.

Hereinafter, according to the exemplary embodiment of the present disclosure, a switching operation according to the second operation mode will be described with reference to FIGS. 5, 7A, and 7B.

The operation mode selection unit 131 determines that startup is completed and selects the second operation mode when a startup condition (e.g. a condition in which the comparison voltage $V_{COMP}$ or the OVP voltage is equal to or less than a predetermined voltage) is not satisfied.

When the operation mode selection unit 131 selects the second operation mode as described above, the switching unit 110 is turned on and then turned off while the DC input power $V_{IN}$ is supplied, and then when energy of the energy storage unit 120 is entirely supplied to a load 143 (an LED string in exemplary embodiment of the present disclosure), the output diode D is shut off.

In this case, the drain voltage $V_{DS}$ generates a resonance waveform due to resonance between the energy storage unit 120 and a parasitic capacitor of the switching unit 110 or between the energy storage unit 120 and a snubber capacitor $C_{snubber}$.

In this case, the drain voltage $V_{DS}$ at the resonance waveform is detected by the voltage detector 133, and the detected drain voltage $V_{DS}$ and the first reference voltage REF1 are compared with each other to output the third signal P3 at a zero point of the resonance waveform.

According to the third signal P3, a switching driving signal $V_G$ of a high level is output through the switching driver 135, and thus the switching unit 110 is turned on. Then, as the energy storage unit current $I_{IN}$ increases while the switching unit 110 is turned on, the energy storage unit 120 stores energy.

In a turn-on period of the dimming switch 144, the feedback voltage $V_{FDBK}$ is detected from a source electrode of the dimming switch 144, and the feedback voltage $V_{FDBK}$ and the second reference voltage (an error reference voltage, REF2) are compared with each other and the error is amplified so as to output the comparison voltage $V_{COMP}$ which is an error amplification voltage.

Then the detection voltage $V_{CS}$ that reflects information about the energy storage unit current $I_{IN}$ is detected via the detection resistor $R_S$, and the detection voltage $R_S$ and the comparison voltage $V_{COMP}$ are compared with each other to output the fourth signal P4.

According to the fourth signal P4, the switching driving signal $V_G$ of a low level is output through the switching driver 135, and accordingly, the switching unit 110 is turned off.

When the switching unit 110 is turned off and the output diode D is conducted, the energy storage unit current $I_{IN}$ flows in the load 143 so as to charge an output capacitor C. Then when energy of the energy storage unit 120 is entirely supplied to the load 143, the drain voltage $V_{DS}$ resonates again, and in this case, the switching operation is performed while repeating the aforementioned operation.

In the second operation mode, a duty of the switching driving signal $V_G$ may be controlled by adjusting a duty of the aforementioned third and fourth signals P3 and P4, and accordingly, a switching operation of the switching unit 110 may be controlled. Accordingly, according to the switching control, the output voltage $V_O$ is maintained constant irrespective change in load, and thus current flowing in the load 143 is also maintained constant.

Second Embodiment

Figure 8:
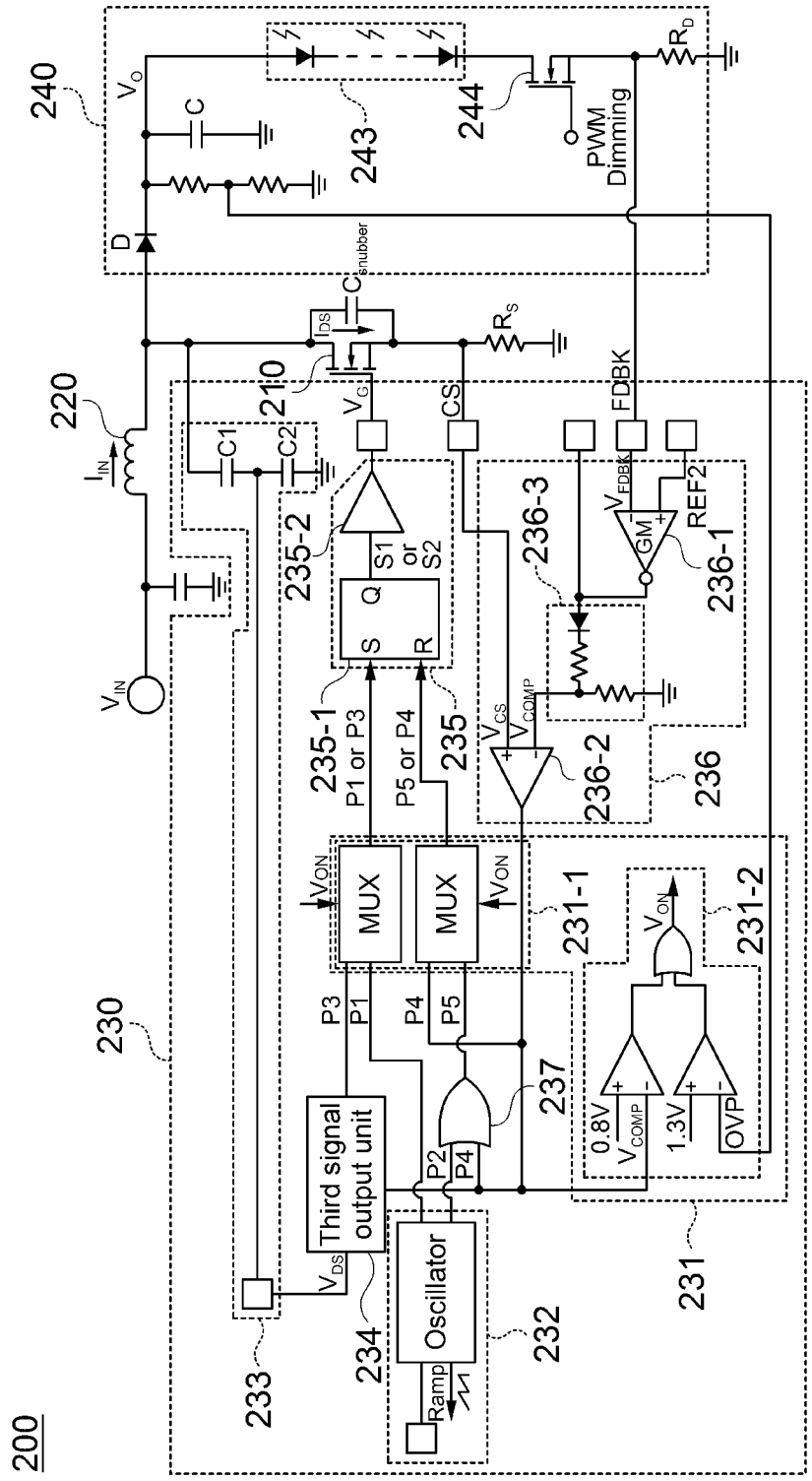
FIG. 8 is a schematic circuit diagram of a converter according to a second embodiment of the present disclosure.

FIG. 8 is a schematic circuit diagram of a converter 200 according to a second embodiment of the present disclosure.

The exemplary embodiment of the present disclosure is described in terms of a boost converter, but the present disclosure is not limited thereto. In addition, like in the first embodiment of the present disclosure, the converter 200 according to the exemplary embodiment of the present disclosure is configured to supply power to a light emitting diode (LED) string 243 having a plurality of LED devices that are connected in series to each other, but the present disclosure is not limited thereto.

As illustrated in FIG. 8, the converter 200 according to the exemplary embodiment of the present disclosure may include a switching unit 210, an energy storage unit 220, a switching controller 230, a detection resistor $R_S$, an output unit 240, etc.

The switching unit 210, the energy storage unit 220, the detection resistor $R_S$, the output unit 240, etc. according to the exemplary embodiment of the present disclosure are the same as in the first embodiment of the present disclosure, and thus a detailed description thereof will be omitted. Accordingly, the converter 200 according to the exemplary embodiment of the present disclosure will be described in terms of different components (the switching controller 230, etc.) and operating processes thereof from the converter 100 according to the first embodiment of the present disclosure.

The switching controller 230 according to the exemplary embodiment of the present disclosure controls the switching unit 210 to selectively perform a switching operation mode for turning on the switching unit 210 at a fixed frequency or a switching operation mode for turning on the switching unit 210 when a voltage between one end and the other end of the switching unit 210, i.e., a drain voltage $V_{DS}$ reaches a lowest point (a time point when a resonance waveform of the drain voltage is a lowest voltage) of a resonance waveform.

Hereinafter, the switching operation mode for turning on the switching unit 210 at a fixed frequency will be referred to as a "first operation mode", and the switching operation mode for turning on the switching unit 210 when the drain voltage $V_{DS}$ reaches a lowest point of a resonance waveform will be referred to as a "second operation mode".

As illustrated in FIG. 8, the switching controller 230 may include an operation mode selection unit 231 in order to control the aforementioned switching operation mode.

In this case, like in the first embodiment of the present disclosure, the operation mode selection unit 231 may selectively execute the first operation mode or the second operation mode according to whether the drain voltage $V_{DS}$ resonates, and for example, may execute the first operation mode in a period in which the drain voltage $V_{DS}$ does not resonate and execute the second operation mode in a period in which the drain voltage $V_{DS}$ resonates.

In general, the output voltage $V_O$ during converter startup does not increase to a sufficient level to be lower than the sum of DC input voltage $V_{IN}$ and a turn-on voltage (e.g. 0.7 V) of the output diode D. Accordingly, during converter startup, a voltage difference between the DC input voltage $V_{IN}$ and the output voltage $V_O$ is not high, and thus resonance may not occur in the drain voltage $V_{DS}$.

On the other hand, the output voltage $V_O$ after startup increases to a sufficient level to be equal to or more than the sum of the DC input voltage $V_{IN}$ and the turn-on voltage of the output diode D such that the drain voltage $V_{DS}$ resonates.

In the end, selection of a switching operation mode according to whether the drain voltage $V_{DS}$ resonates may have the same meaning as selection of a switching operation mode according to the amplitude of an output voltage $V_O$.

Accordingly, like in the first embodiment of the present disclosure, the operation mode selection unit 231 may execute the first operation mode when the amplitude of the output voltage $V_O$ is lower than the sum of a turn-on voltage of the output diode D and the direct current input voltage $V_{IN}$, and execute the second operation mode when the amplitude of the output voltage $V_O$ is equal to or more than the sum of the turn-on voltage of the output diode D and the direct current input voltage $V_{IN}$.

In the end, as seen from the aforementioned description, the first operation mode according to the exemplary embodiment of the present disclosure is a switching operation mode for turning on the switching unit 210 at a fixed frequency in a period in which the drain voltage $V_{DS}$ does not resonate, and the second operation mode according to the exemplary embodiment of the present disclosure is a switching operation mode for turning on the switching unit 210 when the drain voltage $V_{DS}$ reaches a lowest point of a resonance waveform in a period in which the drain voltage $V_{DS}$ resonates.

In other words, the first operation mode according to the exemplary embodiment of the present disclosure is a switching operation mode during startup in which hard-switching is performed at a fixed frequency irrespective resonance of the drain voltage $V_{DS}$, and the second operation mode according to the exemplary embodiment of the present disclosure is a switching operation mode after startup in which soft-switching of a valley switching method is performed.

In the end, like in the first embodiment of the present disclosure, the switching controller 230 according to the exemplary embodiment of the present disclosure may control the operation mode selection unit 231 to execute in the first operation mode of a hard-switching method during startup and to execute in the second operation mode of a soft-switching method after startup.

Under the aforementioned control of the switching controller 230, the converter 200 according to the exemplary embodiment of the present disclosure may selectively control a switching operation mode to perform a hard-switching method during startup and a soft-switching method after startup, and accordingly the voltage boosting operation is possible during startup when the soft-switching method is performed.

Accordingly, according to the exemplary embodiment of the present disclosure, the issue in which the voltage boosting operation is not performed during startup when soft-switching is performed may be overcome, thereby further enhancing the reliability of an SMPS itself.

According to the exemplary embodiment of the present disclosure, soft-switching of a switching device after startup is possible, thereby minimizing switching loss due to high-speed switching, the heating issue of the switching device, etc. As such, in the end, according to the exemplary embodiment of the present disclosure, miniaturization and weight reduction may also be achieved by virtue of capacity reduction of an inductor, a capacitor, etc.

However, when a voltage level of the DC input power $V_{IN}$ is equal to or less than 50% of the output voltage $V_O$, it is possible to detect a zero point in a period in which the drain voltage $V_{DS}$ resonates, and thus the zero-voltage switching method according to the first embodiment of the present disclosure may be employed as the soft-switching method after startup.

Accordingly, according to the exemplary embodiment of the present disclosure, when soft-switching of a valley switching method is performed, a voltage level of the DC input power $V_{IN}$ may be higher than 50% of a voltage level of the output voltage $V_O$.

Hereinafter, configuration of the switching controller 230 as described above will be described in detail with reference to FIG. 8.

As illustrated in FIG. 5, the switching controller 230 according to the exemplary embodiment of the present disclosure may include the operation mode selection unit 231, a fixed frequency signal output unit 232, a voltage detector 233, a third signal output unit 234, and a switching driver 235.

Like in the first embodiment of the present disclosure, the operation mode selection unit 231 may include a selection unit 231-1 and an operation selection signal output unit 231-2.

The selection unit 231-1 may selectively execute a switching operation mode of the first operation mode or the second operation mode.

In this case, like in the first embodiment of the present disclosure, the selection unit 231-1 according to the exemplary embodiment of the present disclosure may employ a multiplexer, but the present disclosure is not limited thereto. The selection unit 231-1 may employ any device as long as the first operation mode or the second operation mode may be selectively changed.

In addition, like in the first embodiment of the present disclosure, the operation selection signal output unit 231-2 may be embodied as a comparator, an OR gate, etc. and accordingly may output an operation selection signal VON to the selection unit 231-1 to control an operation of the selection unit 231-1.

Selection of a switching operation mode according to the aforementioned operation mode selection unit 231 will be described with regard to an operation procedure that will be described later.

Like in the first embodiment of the present disclosure, the fixed frequency signal output unit 232 according to the exemplary embodiment of the present disclosure may be embodied as an oscillator or the like and accordingly, may output the first signal P1 and the second signal P2 of a fixed frequency through the oscillator or the like.

In this case, the first signal P1 is a signal of a fixed frequency for turning on the switching unit 210 and the second signal P2 is a signal of a fixed frequency for turning off the switching unit 210.

In addition, the voltage detector 233 according to the exemplary embodiment of the present disclosure detects a drain voltage $V_{DS}$ at a time point when resonance is started, i.e., the drain voltage $V_{DS}$ at a resonance waveform.

In this case, as illustrated in FIG. 8, the voltage detector 233 may be formed in the form of a voltage distributer including a plurality of capacitors C1 and C2 that are connected between ground and a drain electrode of the switching unit 210. However, the present disclosure is not limited thereto. For example, the voltage detector 233 may be configured to include a plurality of voltage dividing resistors instead of a plurality of capacitors. However, when the voltage detector 233 is configured of plurality of voltage dividing resistors, since leakage current is generated in a boost end, the voltage detector 233 may be configured of a plurality of capacitors.

In addition, when a voltage $V_{DS}$ distributed and detected by the voltage detector 233 reaches an inclination changing point (hereinafter, referred to as a "valley point") corresponding to a lowest point of a resonance waveform, the third signal output unit 234 outputs the third signal P3 for turning on the switching unit 210.

Figure 9:
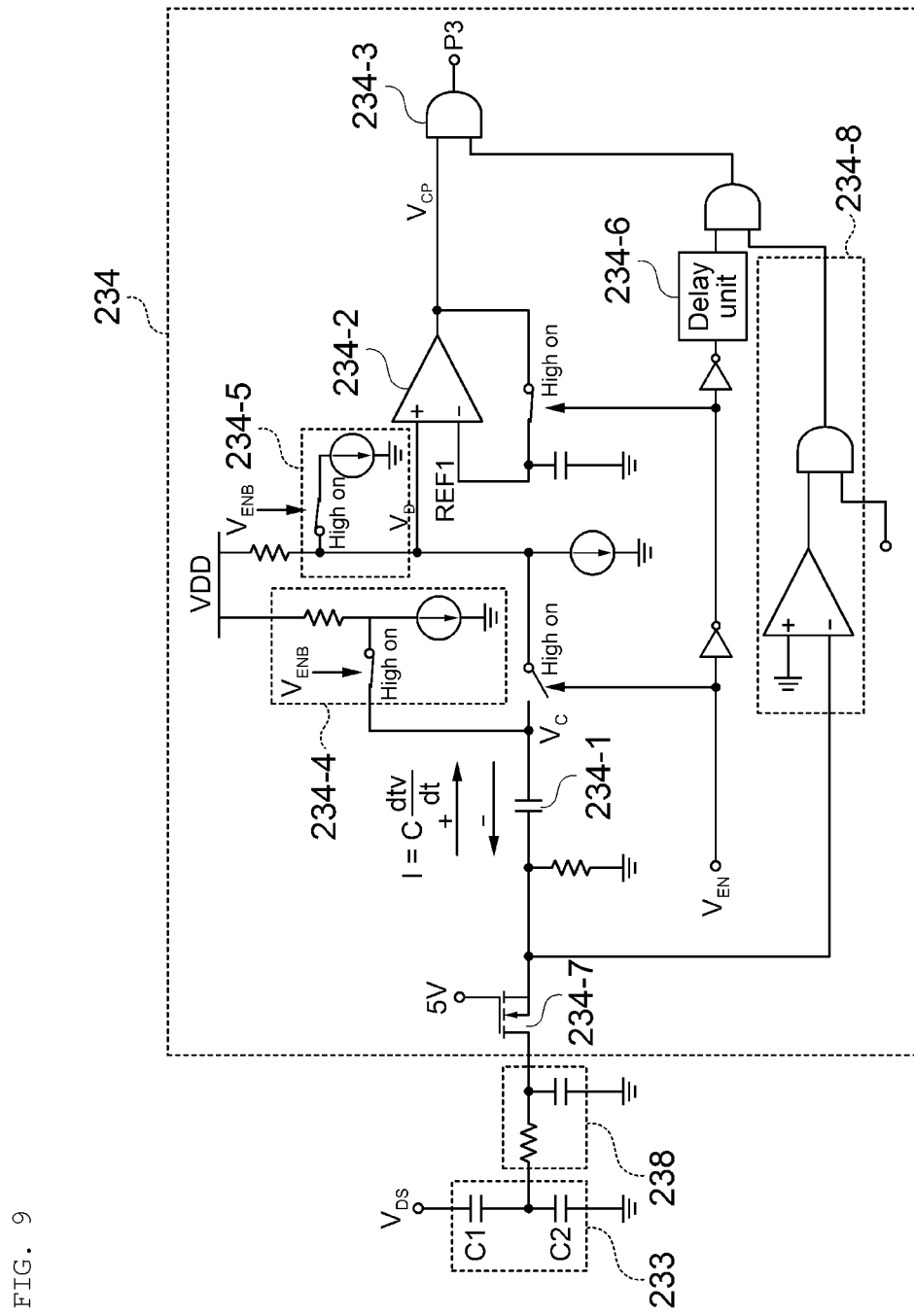
FIG. 9 is a schematic circuit diagram of a third signal output unit according to a second embodiment of the present disclosure.
Figure 10:
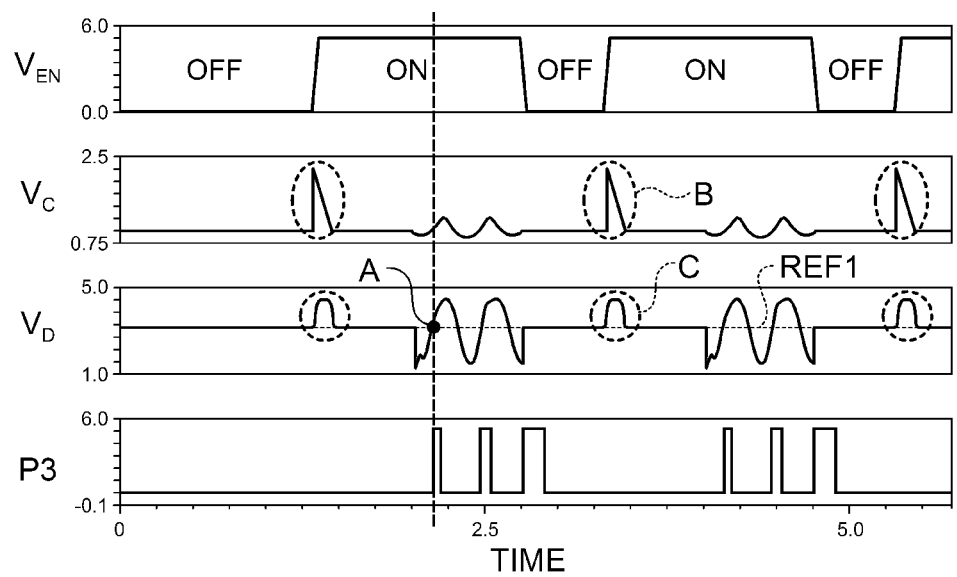
FIG. 10 is a graph showing a signal waveform of main components of a third signal output unit of FIG. 9.

FIG. 9 is a schematic circuit diagram of the aforementioned third signal output unit 234, and FIG. 10 is a graph showing a signal waveform of main components of the third signal output unit 234.

As illustrated in FIG. 9, the third signal output unit 234 may include a differentiator 234-1, a comparator 234-2, and a signal output terminal 234-3, and detect a valley point and output the third signal P3 according to an enable signal $V_{EN}$.

As illustrated in FIG. 9, one end of the differentiator 234-1 is connected to the voltage detector 233 and accordingly, the differentiator 234-1 detects inclination information of the drain voltage $V_{DS}$ detected by the voltage detector 233.

That is, as illustrated in FIG. 9, the differentiator 234-1 may be formed in the form of a capacitor, an end of which is connected to the voltage detector 233, and thus the current characteristics (i.e. the current characteristics containing a differentiation component of the drain voltage $V_{DS}$) of a capacitor according to voltage variation dv/dt of opposite ends of the capacitor may be used to detect inclination information of the drain voltage $V_{DS}$.

As illustrated in FIG. 9, the comparator 234-2 includes an inverting input terminal (−) to which the first reference voltage REF1 is input and a non-inverting input terminal (+) to which a voltage (hereinafter, referred to as a "differentiation voltage $V_D$") corresponding to current flowing in the differentiator 234-1 is input.

The comparator 234-2 according to the exemplary embodiment of the present disclosure compares the differentiation voltage $V_D$ and the first reference voltage REF1 and outputs a comparison signal $V_{CP}$ according to the comparison result. In addition, when the differentiation voltage $V_D$ is lower than the first reference voltage REF1, the comparator 234-2 outputs a comparison signal $V_{CP}$ of a low level, and when the differentiation voltage $V_D$ is higher than the first reference voltage REF1, the comparator 234-2 outputs a comparison signal $V_{CP}$ of a high level.

In this case, as illustrated in FIG. 10, the first reference voltage REF1 may be a voltage obtained by sampling/holding the differentiation voltage $V_D$ when inclination is not changed. That is, as illustrated in FIG. 10, the first reference voltage REF1 may be a voltage when an enable signal $V_{EN}$ of a low level (off) is supplied and a valley point is not detected, in other words, a voltage obtained by sampling/holding the differentiation voltage $V_D$ while the switching unit 210 is turned on.

The signal output terminal 234-3 outputs the third signal P3 for turning on the switching unit 210 according to the comparison signal $V_{CP}$ output from the comparator 234-2. In this regard, according to the exemplary embodiment of the present disclosure, when the comparison signal $V_{CP}$ of a high level is output, the third signal P3 is output.

Hereinafter, an operation of the third signal output unit 234 according to the exemplary embodiment of the present disclosure will be described with reference to FIGS. 9 and 10.

In the second operation mode, that is, in a period in which the drain voltage $V_{DS}$ after startup resonates, an enable signal $V_{EN}$ of a high level (on) is supplied and a switching device of the other end of the differentiator 234-1 is turned on, and accordingly, the third signal output unit 234 performs a valley point detection operation.

Then, when inclination information of the drain voltage $V_{DS}$ is detected using the current characteristics of a capacitor according to voltage variation of opposite ends of the differentiator 234-1, if inclination corresponds to a direction in which the drain voltage $V_{DS}$ decreases, a direction of current flowing in the differentiator 234-1 is a negative (−) direction such that the current flows from the comparator 234-2.

In this case, the amount of current supplied from a driving power source VDD is increased by as much as the amount of current flowing from the comparator 234-2, and accordingly, voltage drop occurs due to resistance, thereby reducing the differentiation voltage $V_D$.

Accordingly, the differentiation voltage $V_D$ is lower than the first reference voltage REF1, and accordingly, the comparator 234-2 outputs a comparison signal $V_{CP}$ of a low level.

Then when inclination is changed in a direction in which the drain voltage $V_{DS}$ is increased, a direction of current flowing in the differentiator 234-1 is a positive (+) direction such that the current flows to the comparator 234-2.

Accordingly, the differentiation voltage $V_D$ is higher than the first reference voltage REF1, and accordingly, the comparator 234-2 outputs a comparison signal $V_{CP}$ of a high level.

According to the comparison signal $V_{CP}$ of a high level, the signal output terminal 234-3 outputs the third signal P3 to the switching driver 235.

That is, the third signal output unit 234 according to the exemplary embodiment of the present disclosure outputs the third signal P3 when a direction of current flowing in the differentiator 234-1 is changed to a positive (+) direction from a negative (−) direction, in other words, when inclination (corresponding to the differentiation voltage $V_D$) of the drain voltage $V_{DS}$ detected by the voltage detector 233 is changed to a positive (+) direction from a negative (−) direction, in the second operation mode.

As illustrated in FIG. 9, the third signal output unit 234 may include a voltage maintaining unit 234-4 and a voltage level reduction unit 234-5.

As illustrated in FIG. 9, the voltage maintaining unit 234-4 may be connected to the other end of the differentiator 234-1 and may include a current source, a switching device, etc. so as to maintain a current constant the differentiation voltage $V_D$ at an on/off time point of the enable signal $V_{EN}$.

When the voltage maintaining unit 234-4 configured as described above is not included in the exemplary embodiment of the present disclosure, a voltage $V_C$ of the other end of the differentiator 234-1 at a time point when the enable signal $V_{EN}$ is changed to on (high level) from off (low level) may float and then may be connected to the differentiation voltage $V_D$ like "B" illustrated in FIG. 10, the differentiation voltage $V_D$ is significantly shaken in a positive (+) direction.

Accordingly, the voltage maintaining unit 234-4 configured as described above is included in the exemplary embodiment of the present disclosure, shake of the differentiation voltage $V_D$ at an on/off time point of the enable signal $V_{EN}$, in particular, a time point when the enable signal $V_{EN}$ is changed to on from off may be minimized (refer to "C" of FIG. 10).

As illustrated in FIG. 9, in order to further prevent a malfunction due to the aforementioned shake of the differentiation voltage $V_D$, the third signal output unit 234 according to the exemplary embodiment of the present disclosure may further include a delay unit 234-6 for delaying a time period until the third signal P3 is output after the enable signal $V_{EN}$ is on.

As illustrated in FIG. 9, the voltage level reduction unit 234-5 may be connected to a non-inverting input terminal (+) of the comparator 234-2 and may include a switching device, a current source, etc. and thus may reduce a voltage level of the first reference voltage REF1 through the switching device, the current source, etc.

As illustrated in FIGS. 9 and 10, the third signal output unit 234 outputs the third signal P3 at a time point when inclination (corresponding to differentiation voltage $V_D$) of the drain voltage $V_{DS}$ detected by the voltage detector 233 is changed to a positive (+) direction from a negative (−) direction, that is, at a valley point A.

However, error in which a valley point is recognized after inclination is actually changed may occur. In addition, due to a phenomenon in which actual time until the switching unit 210 is turned on from the third signal P3 is delayed in the third signal output unit 234, the switching unit 210 is actually turned on after the valley point rather than being turned on at the valley point, and so called 'turn-on delay' occurs.

The turn-on delay as described above may be overcome by reducing a voltage level of the first reference voltage REF1 through the voltage level reduction unit 234-5 for adding load such as a current source, etc.

Figure 11:
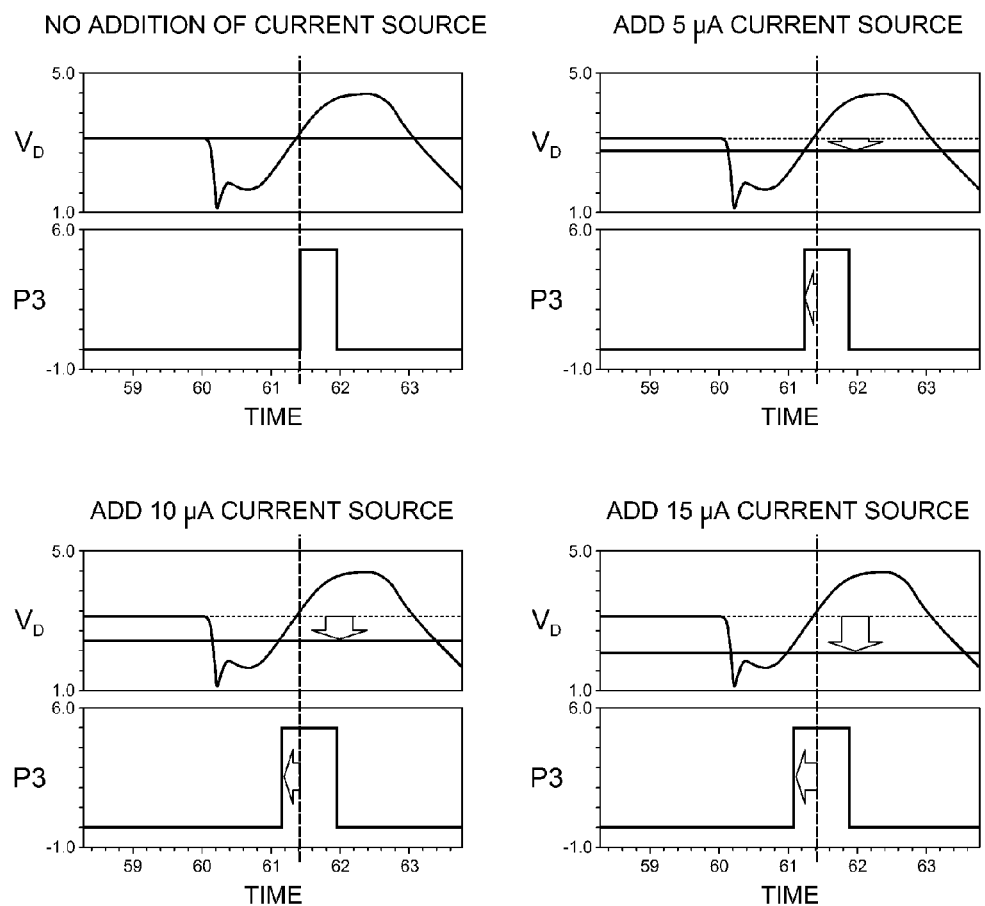
FIG. 11 is a graph of waveforms of a differentiation voltage and a third signal according to a current source condition of a voltage level reduction unit.

In other words, the voltage level of the first reference voltage REF1 may be reduced to put forward a detection time point of a valley point within a scope that is not largely deviated from a valley period, thereby overcoming the above turn-on delay. Waveforms of the third signal P3 and the differentiation voltage $V_D$ according to a current source condition of the voltage level reduction unit 234-5 may also be obviously seen from FIG. 11.

As illustrated in FIG. 9, the third signal output unit 234 may further include a clamping transistor 234-7 between an end of the differentiator 234-1 and the voltage detector 233.

The clamping transistor 234-7 may perform clamping by reducing the drain voltage $V_{DS}$ detected by the voltage detector 233 to a predetermined voltage amplitude so as to protect internal devices of the third signal output unit 234. The exemplary embodiment of the present disclosure employs a transistor for clamping with amplitude of 5 V. Needless to say, it is obvious that 5 V, etc. are merely examples for illustrating the present disclosure, and accordingly, a component for clamping with different amplitude of voltage may be replaced in the present disclosure. In addition, when internal pressure of the internal device is sufficient, the clamping transistor 234-7 may not be used.

As illustrated in FIG. 9, in order to prevent a malfunction due to noise, the third signal output unit 234 may further include a clamping voltage comparator 234-8 that outputs the third signal P3 only when the voltage clamped by the clamping transistor 234-7 is equal to or less than a zero voltage.

In this case, as illustrated in FIG. 9, the switching controller 230 may further include a filter unit 238 that is embodied in the form of RC filter between the voltage detector 233 and the clamping transistor 234-7 so as to remove noise through the filter unit 238, thereby further preventing the malfunction due to noise.

As illustrated in FIG. 8, the switching controller 230 according to the exemplary embodiment of the present disclosure may include a fourth signal output unit 236 and a fifth signal output unit 237.

The fourth signal output unit 236 and the fifth signal output unit 237 according to the exemplary embodiment of the present disclosure are the same as in the first embodiment of the present disclosure, and thus a detailed description thereof is omitted herein.

As illustrated in FIG. 8, the switching driver 235 according to the exemplary embodiment of the present disclosure may include a switching control signal output unit 235-1 and a switching driving signal output unit 235-2.

The switching control signal output unit 235-1 according to the exemplary embodiment of the present disclosure is embodied as an SR flip-flop like in the first embodiment and is described, but the present disclosure is not limited thereto.

As illustrated in FIG. 8, the switching control signal output unit 235-1 may include the set input terminal S to which the first signal P1 or the third signal P3 is input, the reset input terminal R to which the fourth signal P4 or the fifth signal P5 is input, and the output terminal Q from which the first switching control signal S1 or the second switching control signal S2 is output.

When the operation mode selection unit 231 selects the first operation mode during startup, the switching control signal output unit 235-1 generates and outputs the first switching control signal S1 for generation of the switching driving signal $V_G$ according to the first signal P1 output from the fixed frequency signal output unit 232 and the fifth signal P5 output from the fifth signal output unit 237.

Accordingly, when the operation mode selection unit 231 selects the first operation mode during startup, the switching control signal output unit 235-1 outputs the first switching control signal S1 corresponding to the first signal P1 and the fifth signal P5.

For example, when the operation mode selection unit 231 selects the first operation mode during startup, the switching control signal output unit 235-1 according to the exemplary embodiment of the present disclosure outputs the first switching control signal S1 of a high level according to the first signal P1 input to the set input terminal S and outputs the first switching control signal S1 of a low level according to the fifth signal P5 input to the reset input terminal R.

When the operation mode selection unit 231 selects the first operation mode during startup, the switching driving signal output unit 235-2 outputs a switching driving signal $V_G$ for turning on and off the switching unit 110 according to the first switching control signal S1 output from the switching control signal output unit 235-1.

For example, the switching driving signal output unit 235-2 according to the exemplary embodiment of the present disclosure generates a switching driving signal $V_G$ of a high level and outputs the switching driving signal $V_G$ to the switching unit 210 when the first switching control signal S1 of a high level is input to the switching driving signal output unit 235-2, and the switching driving signal output unit 235-2 generates a switching driving signal $V_G$ of a low level and outputs the switching driving signal $V_G$ to the switching unit 210 when the first switching control signal S1 of a low level is input to the switching driving signal output unit 235-2.

Like in the first embodiment of the present disclosure, the switching unit 210 according to the exemplary embodiment of the present disclosure employs an N channel type FET switching device. Accordingly, when the switching driving signal $V_G$ is at a high level, the switching unit 210 is turned on, and when the switching driving signal $V_G$ is at a low level, the switching unit 210 is turned off.

In the end, the switching driver 235 according to the exemplary embodiment of the present disclosure turns on the switching unit 210 in response to the first signal P1 of a fixed frequency when the operation mode selection unit 231 selects the first operation mode during startup, like in the first embodiment of the present disclosure.

When the operation mode selection unit 231 selects the first operation mode during startup, the switching driver 235 according to the exemplary embodiment of the present disclosure turns off the switching unit 210 in response to the fifth signal P5 according to the second or fourth signal P2 or P4, like in the first embodiment of the present disclosure.

When startup is completed and the second operation mode is selected by the operation mode selection unit 231, the switching control signal output unit 235-1 generates and outputs the second switching control signal S2 for generation of the switching driving signal $V_G$ according to the third signal P3 output from the third signal output unit 234 and the fourth signal P4 output from the fourth signal output unit 236.

Accordingly, when startup is completed and the second operation mode is selected by the operation mode selection unit 231, the switching control signal output unit 235-1 outputs the second switching control signal S2 corresponding to the third signal P3 and the fourth signal P4.

For example, when startup is completed and the second operation mode is selected by the operation mode selection unit 231, the switching control signal output unit 235-1 according to the exemplary embodiment of the present disclosure outputs the second switching control signal S2 of a high level according to the third signal P3 input to the set input terminal S and outputs the second switching control signal S2 of a low level according to the fourth signal P4 input to the reset input terminal R.

When startup is completed and the second operation mode is selected by the operation mode selection unit 231, the switching driving signal output unit 235-2 outputs the switching driving signal $V_G$ for turning on or off the switching unit 210 according to the second switching control signal S2 output from the switching control signal output unit 235-1.

For example, when the second switching control signal S2 of a high level is input to the switching driving signal output unit 235-2, the switching driving signal output unit 235-2 according to the exemplary embodiment of the present disclosure generates a switching driving signal $V_G$ of a high level and outputs the switching driving signal $V_G$ to the switching unit 210, and when the second switching control signal S2 of a low level is input to the switching driving signal output unit 235-2, the switching driving signal output unit 235-2 generates a switching driving signal $V_G$ of a low level and outputs the switching driving signal $V_G$ to the switching unit 210.

The switching unit 210 according to the exemplary embodiment of the present disclosure employs an N-channel type FET switching device, and thus when the switching driving signal $V_G$ is at a high level, the switching unit 210 is turned on, and when the switching driving signal $V_G$ is at a low level, the switching unit 210 is turned off.

In the end, the switching driver 235 according to the exemplary embodiment of the present disclosure turns on the switching unit 210 in response to the third signal P3 including lowest point information of a resonance waveform when startup is completed and the second operation mode is selected by the operation mode selection unit 231.

In addition, the switching driver 235 according to the exemplary embodiment of the present disclosure turns off the switching unit 210 in response to the fourth signal P4 when startup is completed and the second operation mode is selected by the operation mode selection unit 231.

Hereinafter, a switching operation mode according to the exemplary embodiment of the present disclosure will be divided into the first operation mode and the second operation mode and described.

<First Operation Mode>

Figure 12A:
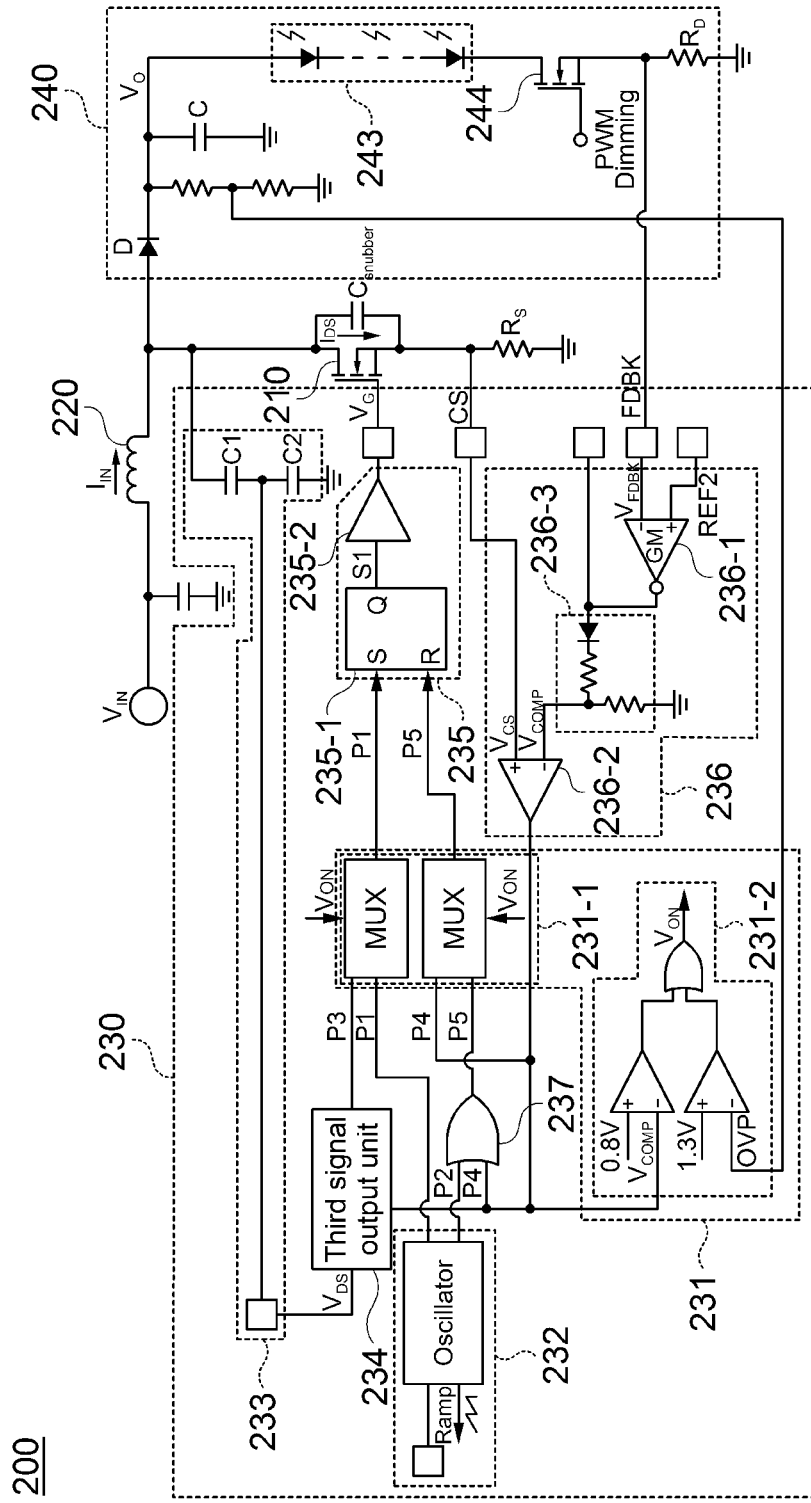
FIG. 12A is a circuit diagram of a case in which the converter of FIG. 8 executes a first operation mode.
Figure 12B:
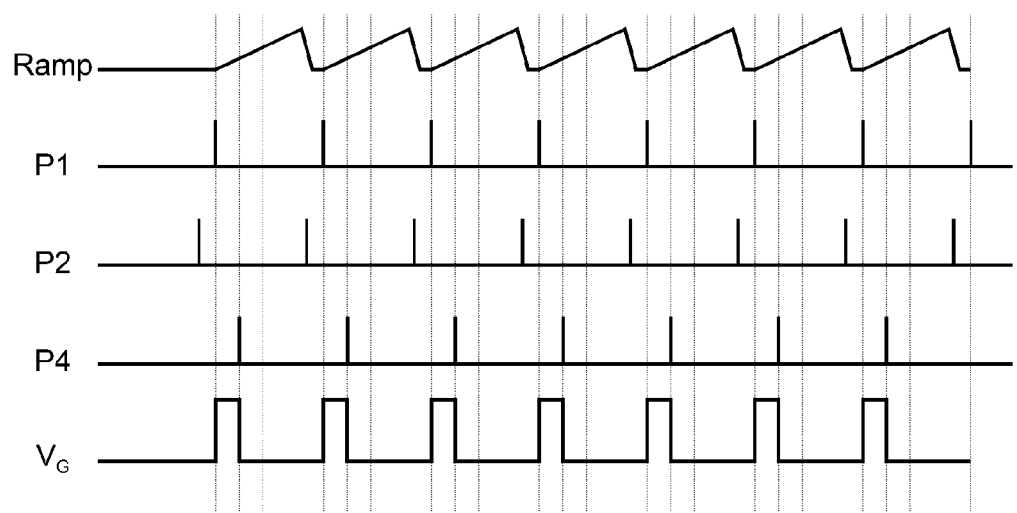
FIG. 12B is a graph showing signal waveforms of main components of the converter of FIG. 12A.

FIG. 12A is a circuit diagram of a case in which the converter 200 of FIG. 8 executes a first operation mode, and FIG. 12B is a graph showing signal waveforms of main components of the converter 200 of FIG. 12A.

Hereinafter, according to the exemplary embodiment of the present disclosure, a switching operation according to the first operation mode will be described with reference to FIGS. 8, 12A, and 12B.

The operation mode selection unit 231 selects the first operation mode when a startup condition is satisfied. For example, when the comparison voltage $V_{COMP}$ generated by a first comparator 236-1 is equal to or less than a predetermined voltage (0.8 V in the exemplary embodiment of the present disclosure) or an OVP voltage detected from an output terminal of the converter 200 is equal to or less than a predetermined voltage (1.3 V in the exemplary embodiment of the present disclosure), the operation mode selection unit 231 may select the first operation mode via an operation selection signal VON as illustrated in FIGS. 8 and 12A. This is because, since the amplitude of the output voltage $V_O$ of the converter 200 is lower than the sum of the DC input voltage $V_{IN}$ and a turn on voltage (e.g. 0.7 V) of the output diode D under the aforementioned condition, the drain voltage $V_{DS}$ does not resonate, and thus the converter 200 has an operation state during startup under the aforementioned condition.

When the first operation mode is selected by the operation mode selection unit 231 as described above, the first signal P1 is output from the fixed frequency signal output unit 232 that is embodied as an oscillator, etc. In this case, the first signal P1 is a signal of a fixed frequency, as illustrated in FIG. 12B.

According to the first signal P1 of a fixed frequency, the switching driving signal $V_G$ of a high level is output through the switching driver 235, and thus the switching unit 210 is turned on.

In a turn-on period of a dimming switch 244, the feedback voltage $V_{FDBK}$ is detected from a source electrode of the dimming switch 244, and the feedback voltage $V_{FDBK}$ and the second reference voltage (an error reference voltage, REF2) are compared with each other and the error is amplified so as to output the comparison voltage $V_{COMP}$ which is an error amplification voltage.

Then the detection voltage $V_{CS}$ that reflects information about the energy storage unit current $I_{IN}$ is detected via a detection resistor $R_S$, and the detection voltage $R_S$ and the comparison voltage $V_{COMP}$ are compared with each other to output the fourth signal P4 illustrated in FIG. 12B.

When the fourth signal P4 is input or the second signal P2 (refer to P2 of FIG. 12B) output from the fixed frequency signal output unit 232 is input, the fifth signal output unit 237 outputs the fifth signal P5.

The switching driving signal $V_G$ of a low level is output through the switching driver 235 according to the fifth signal P5, and accordingly, the switching unit 210 is turned off.

<Second Operation Mode>

Figure 13A:
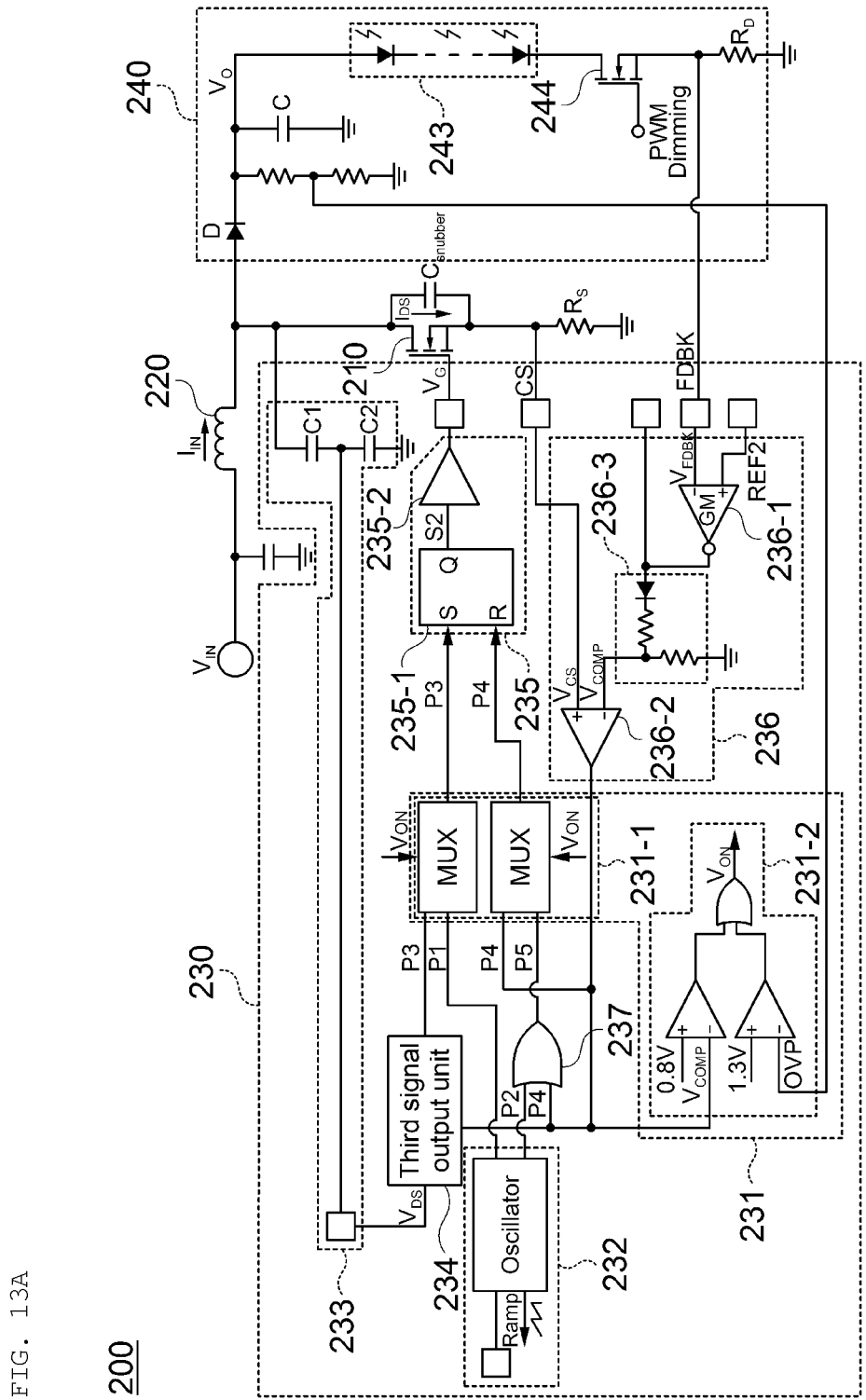
FIG. 13A is a circuit diagram of a case in which the converter of FIG. 8 executes a second operation mode.
Figure 13B:
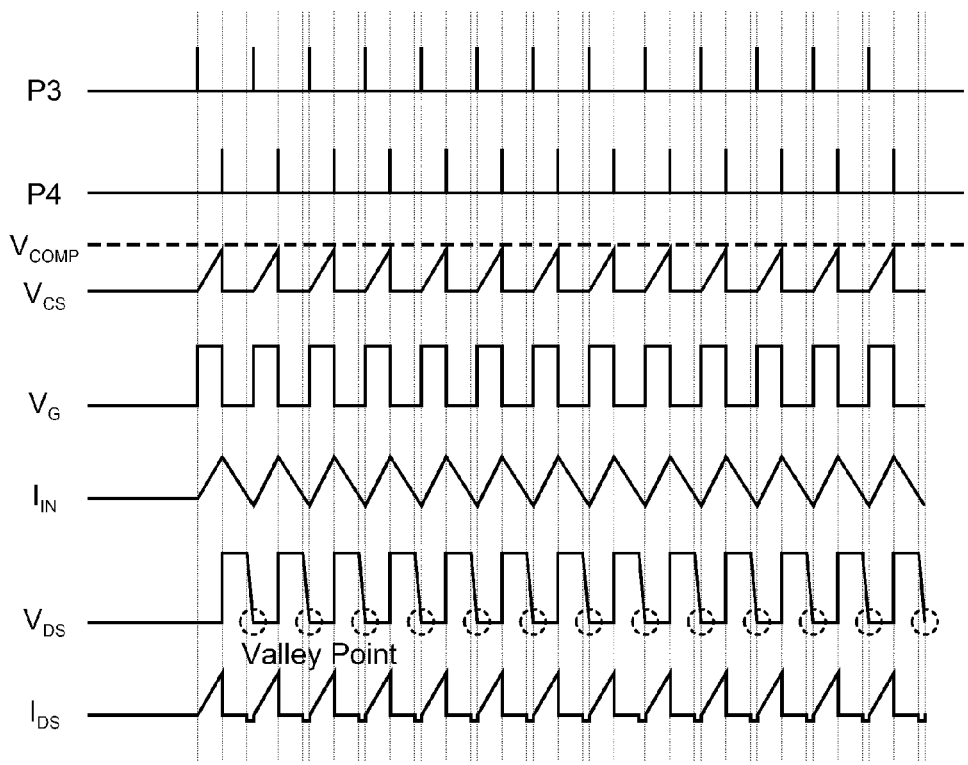
FIG. 13B is a graph showing signal waveforms of main components of the converter of FIG. 13A.

FIG. 13A is a circuit diagram of a case in which the converter 200 of FIG. 8 executes a second operation mode, and FIG. 13B is a graph showing signal waveforms of main components of the converter 200 of FIG. 13A.

Hereinafter, according to the exemplary embodiment of the present disclosure, a switching operation according to the second operation mode will be described with reference to FIGS. 8, 13A, and 13B.

The operation mode selection unit 231 determines that startup is completed and selects the second operation mode when a startup condition (e.g. a condition in which the comparison voltage $V_{COMP}$ or the OVP voltage is equal to or less than a predetermined voltage) is not satisfied.

When the operation mode selection unit 231 selects the second operation mode as described above, the switching unit 210 is turned on and then turned off while the DC input power $V_{IN}$ is supplied, and then when energy of the energy storage unit 220 is entirely supplied to a load 243 (an LED string in exemplary embodiment of the present disclosure), the output diode D is shut off.

In this case, the drain voltage $V_{DS}$ generates a resonance waveform due to resonance between the energy storage unit 220 and a parasitic capacitor of the switching unit 210 or between the energy storage unit 220 and a snubber capacitor $C_{snubber}$.

The drain voltage $V_{DS}$ at the resonance waveform is detected by the voltage detector 233 and the detected drain voltage $V_{DS}$ is input to the third signal output unit 234.

In this case, the enable signal $V_{EN}$ of a high level is applied to the third signal output unit 234 and a switching device of the other end of the differentiator 234-1 is turned on so as to perform a valley point detection operation.

Then inclination information of the drain voltage $V_{DS}$ is detected using the current characteristic of a capacitor according to voltage variation of opposite ends of the differentiator 234-1, and when inclination is changed in a direction in which the drain voltage $V_{DS}$ is increased from a direction in which the drain voltage $V_{DS}$ is reduced, a comparison signal $V_{CP}$ of a high level is output. The third signal P3 according to comparison signal $V_{CP}$ of a high level is output through the third signal output unit 234.

According to the third signal P3, the switching driving signal $V_G$ of a high level is output through the switching driver 235, and accordingly, the switching unit 210 is turned on. Then as the energy storage unit current $I_{IN}$ is increased while the switching unit 210 is turned on, the energy storage unit 220 stores energy.

In a turn-on period of a dimming switch 244, the feedback voltage $V_{FDBK}$ is detected from a source electrode of the dimming switch 244, and the feedback voltage $V_{FDBK}$ and the second reference voltage (an error reference voltage, REF2) are compared with each other and the error is amplified so as to output the comparison voltage $V_{COMP}$ which is an error amplification voltage.

Then the detection voltage $V_{CS}$ that reflects information about the energy storage unit current $I_{IN}$ is detected via a detection resistor $R_S$, and the detection voltage $R_S$ and the comparison voltage $V_{COMP}$ are compared with each other to output the fourth signal P4.

According to the fourth signal P4, the switching driving signal $V_G$ of a low level is output through the switching driver 235, and accordingly, the switching unit 210 is turned off.

When the switching unit 210 is turned off and the output diode D is conducted, the energy storage unit current $I_{IN}$ flows to load 243, and accordingly, the output capacitor C is charged. Then when energy of the energy storage unit 220 is entirely supplied to the load 243, the drain voltage $V_{DS}$ resonates again, and in this case, the switching operation is performed while repeating the aforementioned operation.

In the second operation mode, a duty of the switching driving signal $V_G$ may be controlled by adjusting a duty of the aforementioned third and fourth signals P3 and P4, and accordingly, a switching operation of the switching unit 210 may be controlled. Accordingly, according to the switching control, the output voltage $V_O$ is maintained constant irrespective change in load, and thus current flowing in the load 243 is also maintained constant.

Figure 14:
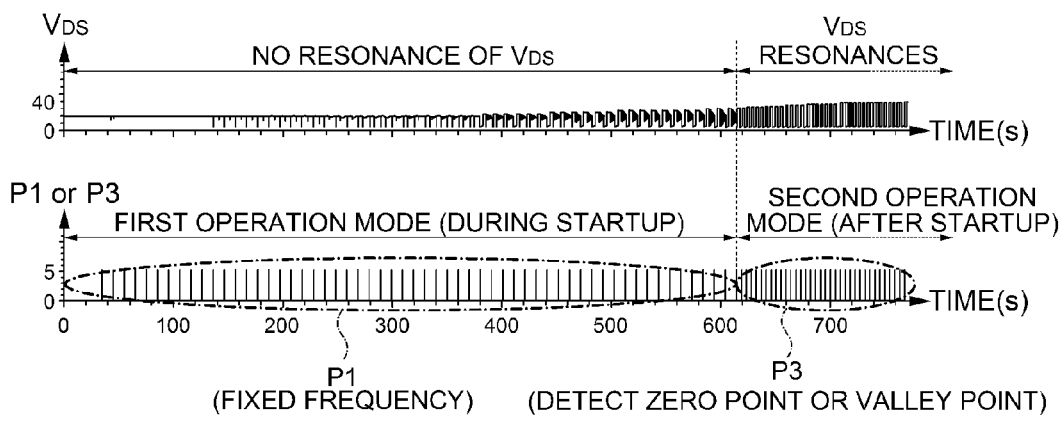
FIG. 14 is a graph of signal output in first and second operation modes according to whether a drain voltage resonates.

In the end, through the aforementioned control configuration and operation, the aforementioned converter according to the first and second embodiments of the present disclosure turns on a switching device at a fixed frequency during startup, that is, in a period in which the drain voltage $V_{DS}$ does not resonate, and turns on the switching device after startup, that is, in a period in which the drain voltage $V_{DS}$ resonates when a zero point or lowest point of the resonance waveform of the drain voltage $V_{DS}$ is reached, which may also be obviously seen from FIG. 14 illustrating output of a signal (in particular, P1 of a fixed frequency and P3 output at a zero point or lowest point of a resonance waveform) in the first and second operation modes according to whether the drain voltage $V_{DS}$ resonates.

In other words, according to the first and second embodiments of the present disclosure, hard-switching is performed (the first operation mode) at a fixed frequency during startup irrespective of resonance of the drain voltage $V_{DS}$, and soft-switching (zero voltage switching or valley switching) is performed (the second operation mode) via detection of a zero point or a valley point of the resonance waveform after startup.

In the end, the converter according to the first and second embodiments of the present disclosure may selectively control a switching operation mode as a hard-switching method during startup and a soft-switching method after startup, the voltage boosting operation is also possible during startup when the soft-switching method is performed, thereby further improving the reliability of an SMPS.

According to the first and second embodiments of the present disclosure, as described above, in the second operation mode, according to the third signal P3 that reflects information of a zero point or lowest point of the drain voltage $V_{DS}$ in a resonance period, a switching operation (zero voltage switching or valley switching) for turning on the switching device may be possible. Accordingly, soft-switching of the switching device after startup is possible, thereby minimizing switching loss due to high-speed switching, the heating issue of the switching device, etc.

In addition, according to the first and second embodiments of the present disclosure, when soft-switching (zero voltage switching or valley switching) is performed, the third signal P3 may be generated and output using only a simple circuit configuration such as a comparator, etc., and thus soft-switching is capable of being performed without a complex circuit configuration.

Functions of various elements illustrated in the drawings of the present disclosure may be provided via dedicated hardware as well as hardware that can execute software in association with appropriate software. When the functions are provided by a processor, the functions can be provided by a single dedicated processor, a single shared processor, or a plurality of individual processors, some of which can be shared.

In addition, the obvious use of the term "controller" should not be interpreted as exclusively indicating hardware that can execute software and may implicitly include a micro processor (MCU), digital signal processor (DSP) hardware, and a read only memory (ROM), a random access memory (RAM), and a non-volatile storage device for storing software.

In the claims of the specification, elements represented as means performing a specific function may cover an arbitrary method for performing the specific function and may include a combination of circuit elements for performing the specific function, firmware coupled to a circuit appropriate to perform software for performing the specific function, an arbitrary form of software including a microcode, etc.

Through the specification, various modifications of the expression 'an embodiment' of the principle of the present disclosure may be interpreted as if specific features, structures, characteristics, etc. associated with the embodiment are included in at least one embodiment of the principle of the present disclosure.

Accordingly, the expression 'an embodiment' and other arbitrary modifications disclosed through the specification do not always indicate the same embodiment.

Through the specification, when the methods are described as including a series of steps, an order of the steps is not always limited to the stated order of the steps, and an arbitrary stated step may be omitted and/or other arbitrary steps that are not stated herein may be added to the methods.

It will be understood that when a component is referred to as being "connected to" another component, it may be directly or indirectly connected to the other component via an electrical or non-electrical method.

In addition, in this specification, the term "adjacent" may be appropriately interpreted as if elements physically contact each other, approach each other, or are present in the same general range or region, according to the context.

Terms used therein are used only for illustrative purposes and are not intended to limit the scope of the inventive concept defined in the claims. An expression used in the singular encompasses the expression of the plural, unless it has a clearly different meaning in the context. Also, it is to be understood that the terms such as "comprise" and/or "comprising" are intended to indicate the existence of the features, numbers, steps, actions, components, parts, or combinations thereof, and are not intended to preclude the possibility that one or more other features, numbers, steps, actions, components, parts, or combinations thereof may exist or may be added.

According to the above present disclosure, a voltage boosting operation is also possible during startup when a soft-switching method is performed.

According to the above present disclosure, switching loss due to high-speed switching, the heating issue of the switching device, etc may be minimized.

According to the above present disclosure, miniaturization and weight reduction may be achieved by virtue of capacity reduction of an inductor, a capacitor, etc.

In addition, according to the above present disclosure, miniaturization and reduction in manufacturing cost may be achieved using a simple circuit configuration.

However, the present disclosure is not limited to the above advantages.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions, and substitutions should also be understood to fall within the scope of the present disclosure.

What is claimed is:

1. A converter, comprising:
    a switching unit;
    an energy storage unit configured to store energy from a direct current (DC) input voltage and to generate an output voltage according to a switching operation of the switching unit; and
    a switching controller configured to control the switching unit to selectively execute a first operation mode to turn on the switching unit at a fixed frequency or a second operation mode to turn on the switching unit, in response to a voltage between an end and another end of the switching unit reaching a zero point of a resonance waveform,
    wherein the switching controller comprises an operation mode selection unit comprising
    a selection unit configured to execute the first operation mode or the second operation mode, and
    an operation selection signal output unit configured to output an operation selection signal to the selection unit and to control an operation of the selection unit according to whether the voltage between the end and the another end of the switching unit resonates.

2. The converter according to claim 1, wherein the operation mode selection unit is further configured to execute the first operation mode in a period in which a voltage between the end and the another end of the switching unit does not resonate and to execute the second operation mode in a period in which the voltage between the end and the another end of the switching unit resonates.

3. The converter according to claim 1, wherein a voltage level of the DC input voltage is less than or equal to 50% of a voltage level of the output voltage.

4. The converter according to claim 1, further comprising an output diode positioned between an output terminal of the converter and the energy storage unit.

5. The converter according to claim 4, wherein the operation mode selection unit is further configured to execute the first operation mode, in response to an amplitude of the output voltage being less than a sum of the DC input voltage and a turn-on voltage of the output diode, and to execute the second operation mode, in response to the amplitude of the output voltage being greater than or equal to the sum of the DC input voltage and the turn-on voltage of the output diode.

6. The converter according to claim 1, wherein the switching controller further comprises:
    a fixed frequency signal output unit configured to output a first signal of the fixed frequency;
    a voltage detector configured to detect the voltage between the end and the another end of the switching unit at the resonance waveform;
    a third signal output unit configured to compare the voltage detected by the voltage detector and a first reference voltage corresponding to the zero point of the resonance waveform, and to output a third signal according to a comparison result; and
    a switching driver configured to turn on the switching unit in response to the first signal when the operation mode selection unit selects the first operation mode, and to turn on the switching unit in response to the third signal when the operation mode selection unit selects the second operation mode.

7. The converter according to claim 6, further comprising a detection resistor connected between a ground and the another end of the switching unit.

8. The converter according to claim 7,
    wherein the fixed frequency signal output unit is further configured to output a second signal of the fixed frequency, and
    wherein the switching controller further comprises
    a fourth signal output unit configured to output a fourth signal using a feedback voltage corresponding to the output voltage and a detection voltage generated by the detection resistor, and
    a fifth signal output unit configured to output a fifth signal, in response to the second signal being input from the fixed frequency signal output unit or the fourth signal being input from the fourth signal output unit.

9. The converter according to claim 8, wherein the switching driver is further configured to turn off the switching unit in response to the fifth signal when the operation mode selection unit selects the first operation mode, and to turn off the switching unit in response to the fourth signal when the operation mode selection unit selects the second operation mode.

10. The converter according to claim 9, wherein the switching driver comprises:
    a switching control signal output unit configured to output a first switching control signal according to the first and fifth signals, in response the operation mode selection unit selecting the first operation mode, and to output a second switching control signal according to the third and fourth signals, in response to the operation mode selection unit selecting the second operation mode; and
    a switching driving signal output unit configured to output a switching driving signal according to the first switching control signal to turn on and off the switching unit, in response to the operation mode selection unit selecting the first operation mode, and to output a switching driving signal according to the second switching control signal to turn on and off the switching unit, in response to the operation mode selection unit selecting the second operation mode.

11. The converter according to claim 8, wherein the fourth signal output unit comprises:
    a first comparator configured to compare the feedback voltage and a second reference voltage to output a comparison voltage according to a comparison result, and a second comparator configured to compare the detection voltage and the comparison voltage to output the fourth signal according to a comparison result.

12. The converter according to claim 6, wherein the voltage detector is formed with voltage dividing resistors connected between a ground and the end of the switching unit.

13. The converter according to claim 6, wherein the voltage detector is formed with capacitors connected between a ground and the end of the switching unit.

14. The converter according to claim 1, wherein the switching unit comprises snubber capacitors connected in parallel.

15. A converter comprising:
    a switching unit;
    an energy storage unit configured to store energy from a direct current (DC) input voltage and to generate an output voltage according to a switching operation of the switching unit; and
    a switching controller configured to control the switching unit to selectively execute a first operation mode to turn on the switching unit at a fixed frequency or a second operation mode to turn on the switching unit, in response to a voltage between an end and another end of the switching unit reaching a lowest point of a resonance waveform,
    wherein the switching controller comprises an operation mode selection unit comprising
        a selection unit configured to selectively execute the first operation mode or the second operation mode, and
        an operation selection signal output unit configured to output an operation selection signal to the selection unit and to control an operation of the selection unit according to whether the voltage between the end and the another end of the switching unit resonates.

16. The converter according to claim 15, wherein the operation mode selection unit is further configured to execute the first operation mode in a period in which the voltage between the end and the another end of the switching unit does not resonate and to execute the second operation mode in a period in which the voltage between the end and the another end of the switching unit resonates.

17. The converter according to claim 15, wherein a voltage level of the DC input voltage is higher than 50% of the output voltage.

18. The converter according to claim 15, further comprising an output diode positioned between an output terminal of the converter and the energy storage unit.

19. The converter according to claim 18, wherein the operation mode selection unit is further configured to execute the first operation mode, in response to an amplitude of the output voltage being less than a sum of the DC input voltage and a turn-on voltage of the output diode, and to execute the second operation mode, in response to the amplitude of the output voltage being greater than or equal to the sum of the DC input voltage and the turn-on voltage of the output diode.

20. The converter according to claim 15, wherein the switching controller further comprises
    a fixed frequency signal output unit configured to output a first signal of the fixed frequency,
    a voltage detector configured to detect the voltage between the end and the another end of the switching unit at the resonance waveform,
    a third signal output unit configured to output a third signal, in response to a voltage detected by the voltage detector reaching an inclination changing point corresponding to the lowest point of the resonance waveform, and
    a switching driver configured to turn on the switching unit in response to the first signal when the operation mode selection unit selects the first operation mode, and to turn on the switching unit in response to the third signal when the operation mode selection unit selects the second operation mode.

21. The converter according to claim 20, wherein the third signal output unit is further configured to output the third signal, in response to inclination of the voltage detected by the voltage detector changing to a positive direction from a negative direction.

22. The converter according to claim 20, wherein the third signal output unit further comprises a differentiator with the end connected to the voltage detector, and wherein the third signal output unit is configured to detect inclination information of the voltage detected by the voltage detector.

23. The converter according to claim 22, wherein the third signal output unit is further configured to output the third signal, in response to a direction of current flowing in the differentiator changing from a negative direction to a positive direction.

24. The converter according to claim 22,
    wherein the third signal output unit is further configured to output the third signal, and to detect the inclination change point according to an enable signal, and
    wherein the third signal output unit further comprises:
        a comparator configured to compare a differentiation voltage corresponding to current flowing in the differentiator and a first reference voltage to output a comparison signal according to a comparison result, and
        a signal output terminal configured to output the third signal according to the comparison signal.

25. The converter according to claim 24, wherein the first reference voltage is obtained by sampling and holding a differentiation voltage, in response to inclination not changing.

26. The converter according to claim 24, wherein the third signal output unit further comprises
    a voltage maintaining unit connected to another end of the differentiator and configured to maintain constant a differentiation voltage at an on/off time point of the enable signal, and
    a voltage level reduction unit connected to the comparator and configured to reduce a voltage level of the first reference voltage.

27. The converter according to claim 20, further comprising a detection resistor connected between a ground and the another end of the switching unit.

28. The converter according to claim 27,
    wherein the fixed frequency signal output unit is further configured to output a second signal of the fixed frequency, and
    wherein the switching controller further comprises
        a fourth signal output unit configured to output a fourth signal using a feedback voltage corresponding to the output voltage and a detection voltage generated by the detection resistor; and
        a fifth signal output unit configured to output a fifth signal, in response to the second signal being input from the fixed frequency signal output unit or the fourth signal being input from the fourth signal output unit.

29. The converter according to claim 28, wherein the switching driver is further configured to turn off the switching unit in response to the fifth signal when the operation mode selection unit selects the first operation mode, and to turn off the switching unit in response to the fourth signal when the operation mode selection unit selects the second operation mode.

30. The converter according to claim 29, wherein the switching driver comprises
- a switching control signal output unit configured to output a first switching control signal according to the first and fifth signals, in response to the operation mode selection unit selecting the first operation mode and outputting a second switching control signal according to the third and fourth signals, in response to the operation mode selection unit selecting the second operation mode; and
- a switching driving signal output unit configured to output a switching driving signal according to the first switching control signal to turn on and off the switching unit, in response to the operation mode selection unit selecting the first operation mode, and to output the switching driving signal according to the second switching control signal to turn on and off the switching unit, in response to the operation mode selection unit selecting the second operation mode.

31. The converter according to claim 28, wherein the fourth signal output unit comprises
- a first comparator configured to compare the feedback voltage and a second reference voltage to output a comparison voltage according to a comparison result; and
- a second comparator configured to compare the detection voltage and the comparison voltage to output the fourth signal according to a comparison result.

32. The converter according to claim 20, wherein the voltage detector is formed with a capacitors connected between a ground and the end of the switching unit.

33. The converter according to claim 15, wherein the switching unit comprises snubber capacitors connected in parallel.

* * * * *